United States Patent
Suzuki et al.

[19]

[11] Patent Number: 6,003,067
[45] Date of Patent: Dec. 14, 1999

[54] DATA TRANSMISSION CONTROLLING METHOD AND DATA TRANSMISSION CONTROLLING SYSTEM, AND COMPUTER MEMORY PRODUCT

[75] Inventors: Toshimitsu Suzuki; Kazumi Saito; Sadao Yashiro; Takahide Muramoto, all of Kawasaki, Japan

[73] Assignee: Fujitsu Limited, Kawasaki, Japan

[21] Appl. No.: 08/880,539

[22] Filed: Jun. 23, 1997

[30] Foreign Application Priority Data

Jan. 31, 1997 [JP] Japan ................................. 9-019477

[51] Int. Cl.⁶ .................................................. G06F 15/16
[52] U.S. Cl. .......................... 709/204; 709/205; 345/330; 345/340; 345/344; 345/345
[58] Field of Search ..................... 395/200.33, 200.34, 395/200.54; 345/345, 419, 473, 329, 330, 344; 709/204, 205

[56] References Cited

U.S. PATENT DOCUMENTS

| 4,833,535 | 5/1989 | Ozeki et al. . | |
|---|---|---|---|
| 5,481,297 | 1/1996 | Cash et al. . | |
| 5,583,980 | 12/1996 | Anderson | 345/473 |
| 5,682,166 | 10/1997 | Takahashi | 345/419 |
| 5,812,132 | 9/1998 | Goldstein | 345/345 |

FOREIGN PATENT DOCUMENTS 3-16390  1/1991  Japan .

OTHER PUBLICATIONS

Ambras et al., "MicroScope: an integrated program analysis toolset.", Hewlett–Packard Journal, v39 No. 4, p. 71, Aug. 1988.
Anonymous, "Data Based Advisor COMDEX sneak preview", Data Based Advisor, v7 No. 11, p. 71, Nov. 1989.
Maestri, George, "Aldus AfterImage", Digital Video Magazine, v2 No. 11, p. 85, Dec. 1994.
Richter, Jeffrey, "Extend the Windows 95 shell with application desktop toolbars", Microsoft Systems Journal, v11 No. 3, p. 35, Mar. 1996.

Primary Examiner—Frank J. Asta
Assistant Examiner—Almari Romero
Attorney, Agent, or Firm—Staas & Halsey LLP

[57] ABSTRACT

A data transmission processing method and system and a computer memory product capable of quickly performing the displaying operation of the screen data by transmitting of the screen data except the units which do not display on the screen due to hiding, to the first information processing apparatus from the second information processing apparatus.

23 Claims, 18 Drawing Sheets

DATA TRANSMISSION CONTROLLING METHOD AND DATA TRANSMISSION CONTROLLING SYSTEM, AND COMPUTER MEMORY PRODUCT

BACKGROUND OF THE INVENTION

The present invention relates to a data transmission controlling method and a data transmission controlling system about a communication system of transmitting screen data with the use of a network such as telephone line, cable and satellite communication.

In a communication system using the network such as an educational communication system aimed at remote education, with a plurality of students (clients) having individual terminals with respect to one teacher (server), the same images are displayed on the screen of a teacher and the screens of students. The screen images of a plurality of students are displayed on the screen of the teacher or the screen images of the teacher is displayed on the screen of the student on occasion, so as to effect the education of students staying at remote locations. The teacher's screen images are broadcast onto the students' screen images with the use of cable or satellite communication to display the screen data as text on a plurality of students' screen images as in the television. Also, questions from the students are received by the public line, so as to establish both the directional properties.

FIG. 1 and FIG. 2 are diagrams for the conventional remote communication system. FIG. 1 shows use of a satellite communication. FIG. 2 shows use of a LAN (Local Area Network). In a system shown in FIG. 1, the distances between the server (computer) 1 and a plurality of clients (computers) 3 and 3 . . . become far respectively with distances being connected with the public line. The data from the server 1, for example, the screen images of the server or part thereof, is transmitted to the respective clients 3 and 3 . . . by satellite communication. The questions from the clients 3 and 3 . . . are transmitted to the server 1 with the use of the public line.

In the system of FIG. 2, the server 1 and a plurality of clients 3 and 3 . . . are connected respectively with such a network line 2 as the LAN, so that the communicating operation within the same classroom and between the mutual remote locations can be conducted. The screen images of the server 1 are transmitted to the optional client 3 and the screen images of the clients 3 and 3 . . . are transmitted to the server 1. The oral questions and answers with respect to the clients 3 can be conducted in the communication within the same classroom. In the communication in the remote locations, the user of the clients 3 and 3 . . . can learn by themselves, referring to the text displayed on the screen of the server 1 by the use of, for example, the WWW (World Wide Web) server.

Such a remote educational system can manage the learning condition of the clients 3 by displaying the screen image of the client 3 on the screen of the server 1. For example, the screen images of a plurality of clients 3 and 3 . . . are window-displayed on the screen of the server 1 and can manage at the same time the learning condition of a plurality of clients 3 and 3 . . . . FIG. 3 shows the displaying condition of the screen of the server. As shown in the drawing, the screen images 30 and 30 . . . of the clients which a user 1, a user 2, . . . , a user N use are window-displayed on the screen 10 of the server. When the number of the clients is few, all the respective client screen images 30 are displayed. When the number of the clients is many, the screen images 30 of all the clients are displayed through superposing of the windows as shown in the user 1 and the user 2 in the drawing.

The remote educational system as described above has a problem in that the displaying operation of the screen data transmitted to the server from the clients is slower, because the transmission data amount is more due to the transmission of the screen data from a plurality of clients to the server or longer time is taken to display the screen data. There is another problem in that one unit of the screen image is superposed and hidden so that the learning condition of the client users is hard to understand when the window-displaying operation is conducted with the client screen images being superposed. Furthermore, there is still another problem when the user of the server is late in noticing it when the client takes some action with one unit of the screen images being superposed and hidden.

BRIEF SUMMARY OF THE INVENTION

Accordingly, one object of the present invention is to provide a data transmission processing method and a data transmission processing system for reducing the transmission data amount and quickly conducting the displaying operation of the screen data by transmitting from a second information processing apparatus to a first information processing apparatus an screen data, except for a unit hidden and not displayed on the screen of the first information processing apparatus. One object thereof is to provide a computer memory product on which a program for controlling the data transmission operation is recorded.

A data transmission controlling method of the invention comprises the steps of transmitting screen data to a first information processing apparatus from a plurality of second information processing apparatuses, with the first information processing apparatus and the second information processing apparatus being connected with each other through a network, so as to display the screen data on the respective display areas assigned onto the screen of the first information processing apparatus; judging whether or not the display areas are superposed on each other; detecting the hidden area superposed in the displaying areas, about the second information processing apparatus where at least one unit of the screen data is not displayed in the display area, among the second information processing apparatuses when the display areas are superposed; and transmitting the screen data except screen data corresponding to the hidden area in the second information processing apparatus, to the first information processing apparatus.

A data transmission controlling system of the invention comprises a means for judging whether or not the displaying areas are superposed on each other; a means for detecting the hidden areas superposed in the display area about the second information processing apparatus where at least one unit of the screen data is not displayed in the display area, among the second information processing apparatus when the display areas are superposed; a means for extracting the remaining screen data, except screen data corresponding to the hidden area, from the screen data of the second information processing apparatus; and a means for transmitting the extracted screen data to the first information processing apparatus.

Furthermore, a computer memory product of the invention has a program for causing computers to execute the steps of judging whether or not the display areas are superposed on each other; detecting the hidden areas superposed in the display area about the second information processing apparatus where at least one unit of the screen data is not displayed in the display area, among the second information processing apparatus when they are superposed; and transmitting the screen data except screen data corresponding to the hidden area in the second information processing apparatus, to the first information processing apparatus.

The hidden areas where the screen data is not displayed due to the superposition of the display areas are managed about each of the second information processing apparatus, and the remaining screen data where the screen data in the hidden areas is excluded among the screen data are transmitted from the second information processing apparatus to the first information processing apparatus. Since the screen data in the hidden area is not transmitted, the transmission data amount is reduced and the transmission time and the display time of the screen data are reduced.

Furthermore, a first information processing apparatus of the invention comprises a means for judging whether or not the display areas are superposed on each other; a means for detecting the hidden area superposed in the display area about the second information processing apparatus where at least one unit of the screen data is not displayed in the display area, among the second information processing apparatus when the display areas are superposed; and a means for notifying the second information processing apparatus of the detected hidden area.

Since the first information processing apparatus can detect the hidden areas, the mutually superposed units, of the display area to be displayed on the screen to notify the second information processing apparatus having the hidden areas of the hidden area existence, the minimum necessary screen data can be demanded with respect to the respective second information processing apparatuses, so as to effectively use the transmission zone.

Also, a second information processing apparatus of the invention comprises a means for storing the hidden area, superposed in the display area, notified from the first information processing apparatus; a means for extracting the remaining screen, except screen data corresponding to hidden areas, from the screen data; and a transmitting means for transmitting the extracted screen data to the first information processing apparatus.

Therefore, since the second information processing apparatus is notified of the hidden areas not displayed in screen data due to superposition, in the display area to be displayed on the screen of the first information processing apparatus, the screen data of necessary minimum screen data can be transmitted by the extraction of the screen data except screen data corresponding to the hidden areas, so as to effect the transmission zone.

Another object of the invention is to provide a data transmission processing method and a data transmission processing system for further quickly displaying the screen data by correspondingly changing the screen data not transmitted when the areas hidden, not displayed have been changed. Also, the object thereof is to provide a computer memory product where a program for controlling the data transmitting operation is recorded.

The data transmission controlling method of the invention comprises the steps of storing the hidden areas detected after detecting of the hidden areas; judging whether or not the hidden areas was changed after transmitting the screen data to the first information processing apparatus; transmitting the screen data except screen data corresponding to the hidden area changed in the second information processing apparatus to the first information processing apparatus when the hidden area was changed; and storing the hidden area changed.

The data transmission controlling system of the invention comprises a means for storing the detected, hidden area; and a means for judging whether or not the hidden area was changed after transmitting the screen data to the first information processing apparatus, the screen data extracting means when the hidden area was changed extracts the screen data except the hidden area changed, from the screen data of the second information processing apparatus, and the hidden area storing means stores the hidden area changed.

The computer memory product of the invention has a program for causing computers to execute the steps of storing the detected hidden area after detecting the hidden area; judging whether or not the hidden area was changed after transmitting screen data to the first information processing apparatus; transmitting the screen data except screen data corresponding to the hidden area changed, in the second information processing apparatus to the first information processing apparatus when changed; and storing the hidden area changed.

Since the transmitting screen data is extracted each time the hidden area is changed, the necessary minimum screen data can be transmitted in accordance with image displaying condition of the fist information processing apparatus, so as to further use the transmission zone effectively.

Still another object of the invention is to provide a data transmission processing method and a data transmission processing system where the first information processing apparatus manages the renewing or the question, answer of the screen data of the second information processing apparatus. Also, another object thereof is to provide a computer memory product where a program for controlling the data transmission is recorded.

The data transmission controlling method of the invention comprises the steps of judging whether or not the screen data of the second information processing apparatus having the hidden area was renewed; measuring a predetermined period; and informing the second information processing apparatus whose the information data is not renewed in the predetermined period, by the first information processing apparatus.

Also, the data transmission controlling system of the invention comprises a means for judging whether or not the screen data of the second information processing apparatus having the hidden area was renewed; a timer for measuring a predetermined period; and a means for notifying the second information processing apparatus whose the screen data is not renewed in the predetermined period, by the first information processing apparatus.

The computer memory product of the invention has a program recorded to cause the computers to execute the steps of judging whether or not the screen data of the second information processing apparatus having the hidden area was renewed; measuring the predetermined period; and informing the second information processing apparatus whose screen data is not renewed in the predetermined period, by the first information processing apparatus.

Accordingly, since the second information processing apparatus where the screen data is not changed in a predetermined period is notified by the first information processing apparatus, for example, a second information processing apparatus where an operation is not effected, can be found earlier.

The data transmission controlling method of the invention comprises the steps of judging whether or not the screen data of the second information processing apparatus having the hidden area was renewed; and causing the display area, for displaying the screen data of the second information processing apparatus which was renewed, to move to the uppermost layer on the first information processing apparatus.

The data transmission controlling system of the invention comprises a means of judging whether or not the screen data of the second information processing apparatus having the hidden area was renewed; and a means of causing the display area, for displaying the screen data of the second information processing apparatus which was renewed, to move to the uppermost layer on the first information processing apparatus.

The computer memory product of the invention has a program recorded to cause the computers to execute the steps of judging whether or not the screen data of the second information processing apparatus having the hidden area was renewed; and causing the display area, for displaying the screen data of the second information processing apparatus which was renewed, to move to the uppermost layer on the first information processing apparatus.

Therefore, since the screen data of the second information processing apparatus is displayed on all the face in the display area of the uppermost layer when the screen data of the second information processing apparatus was changed, the first information processing apparatus can be corresponded quickly to the change of the screen data.

The data transmission controlling method of the invention comprises the steps of detecting the speaking of the user of the second information processing apparatus; and notifying the second information processing apparatus whose speaking was detected, by the first information processing apparatus.

The data transmission controlling system of the invention comprises a means of detecting the speaking of the user of the second information processing apparatus; and a means for notifying the second processing apparatus whose speaking was detected, by the first information processing apparatus.

The computer memory product of the invention has a program recorded for causing the computers to execute the steps of detecting the speaking of the user of the second information processing apparatus; and notifying the second information processing apparatus whose speaking was detected, by the first information processing apparatus.

Therefore, since the second information processing apparatus showing the actions of questions or the like is specified earlier, the first information processing apparatus can react quickly to the actions.

The above and further objects and features of the invention will more fully be apparent from the following detailed description with accompanying drawings.

DETAILED DESCRIPTION OF THE INVENTION

The present invention will be described referring the drawings illustrating embodiments.

First Embodiment

Figure 1:
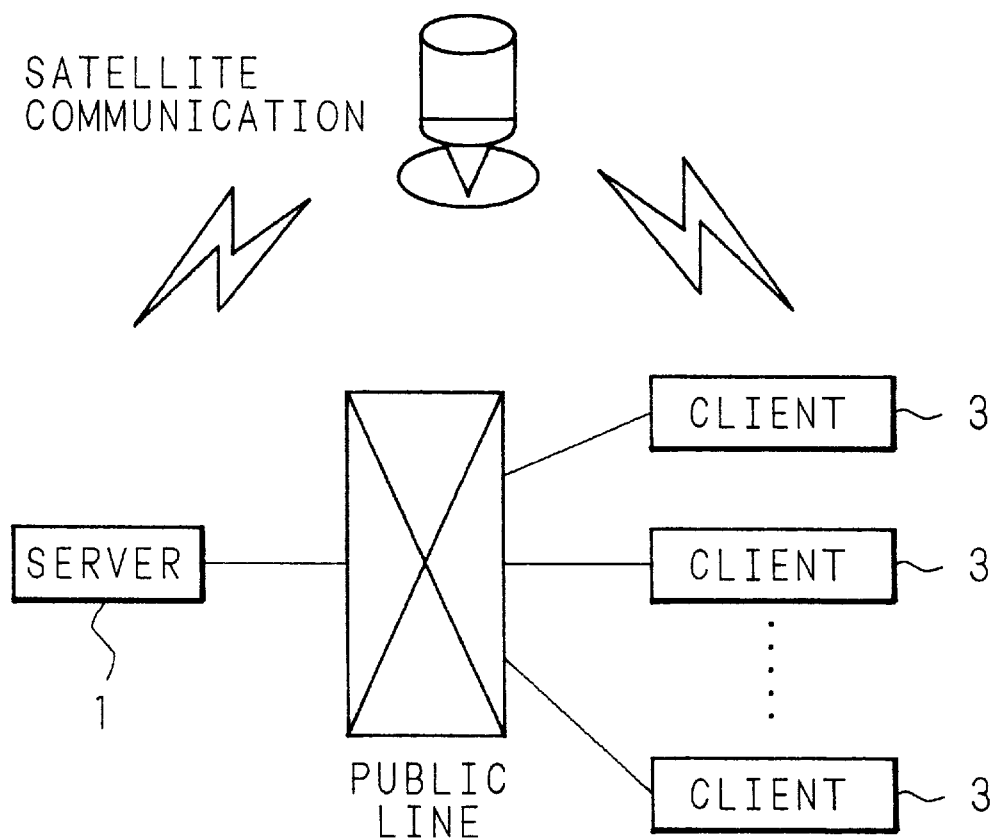
FIG. 1 is a diagram showing the configuration of the conventional remote communicating system (satellite communication)
Figure 2:
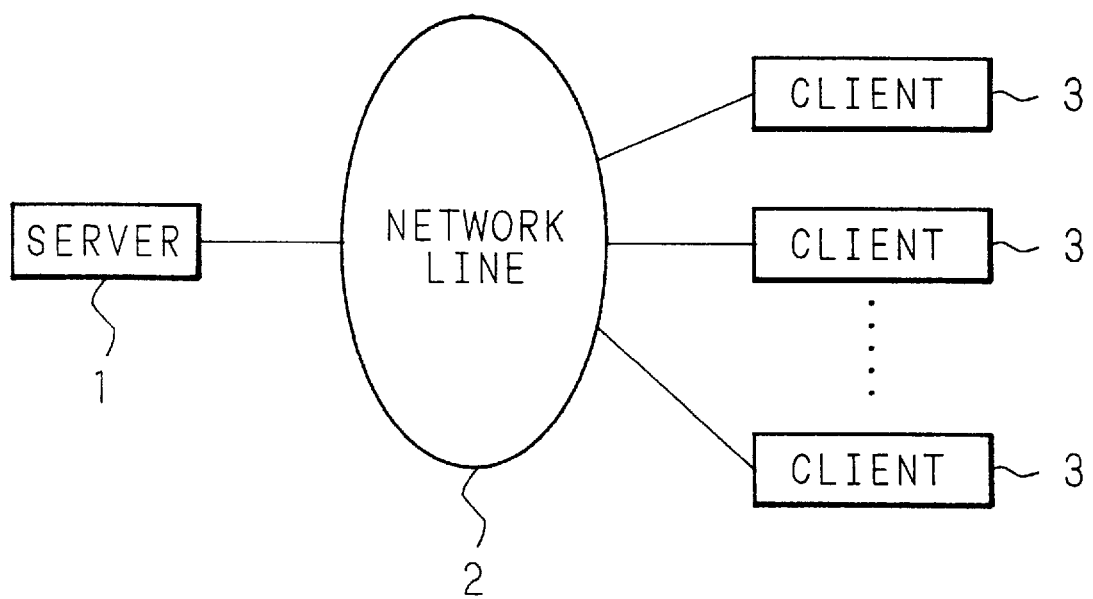
FIG. 2 is a diagram of the conventional remote communication system (LAN)
Figure 3:
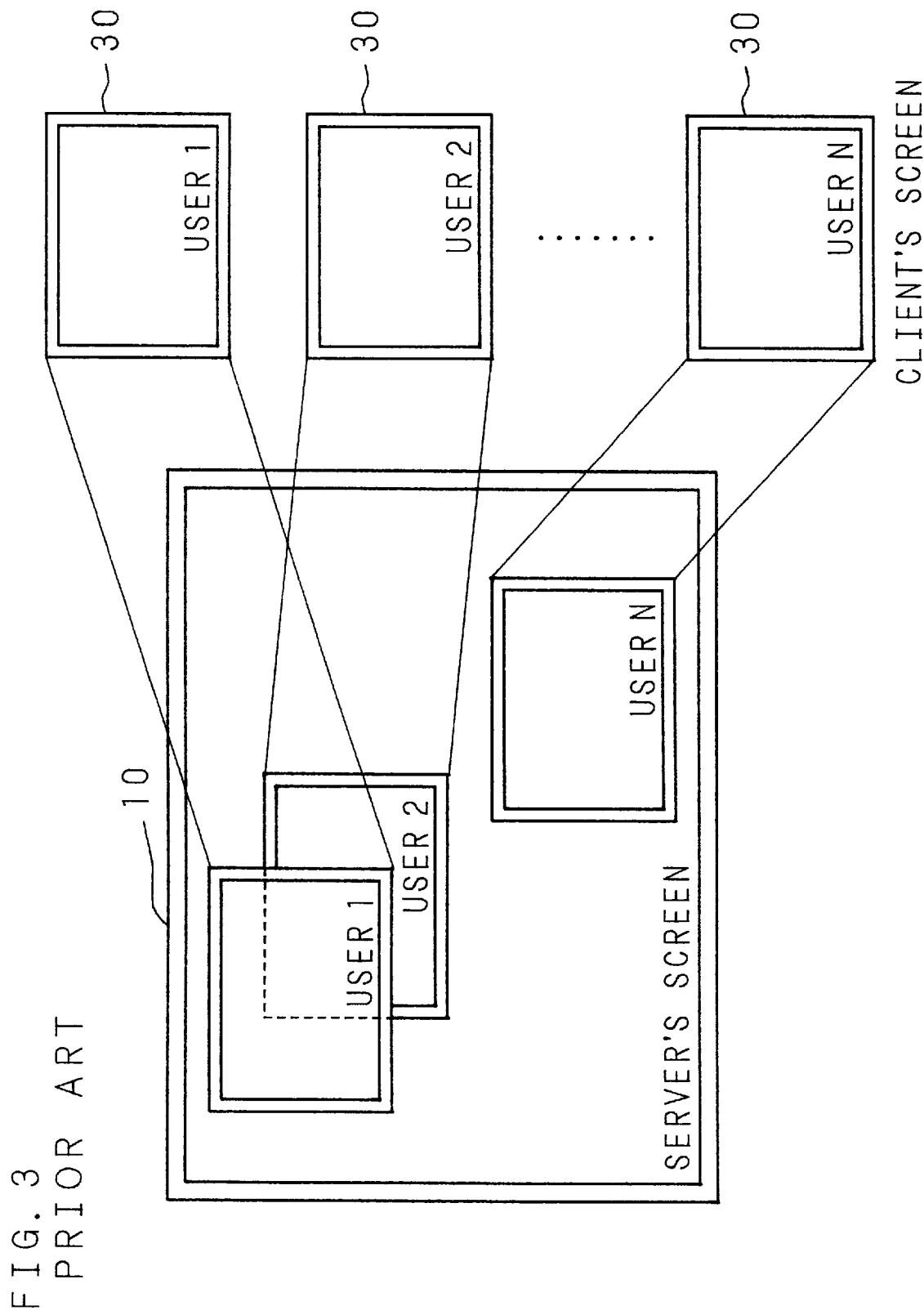
FIG. 3 shows the displaying condition of a server screen.
Figure 4:
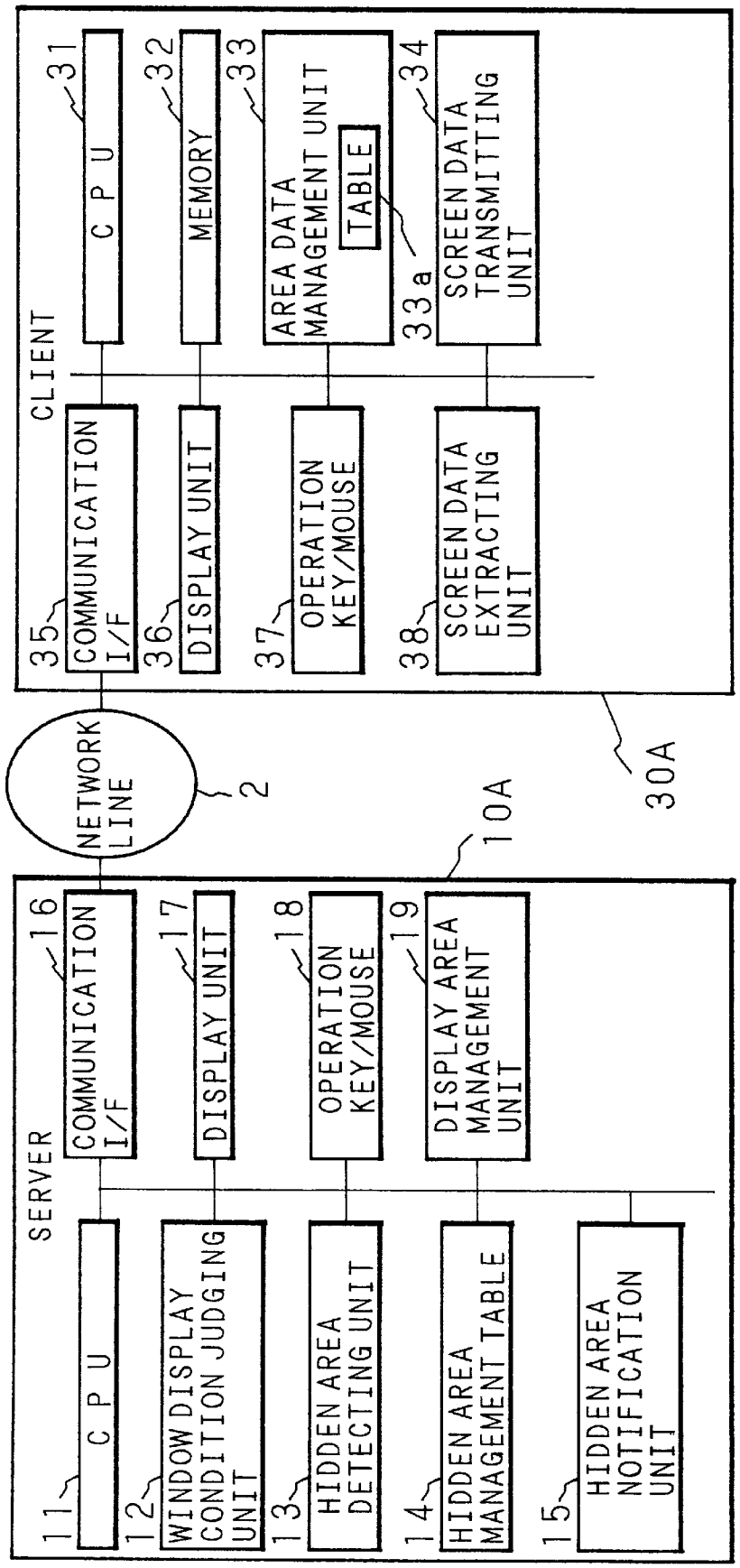
FIG. 4 is a diagram showing the configuration of a data transmission controlling system in a first embodiment.

FIG. 4 shows the configuration of the data transmission controlling system in a first embodiment of the invention, the system aimed in the remote educational communication. As shown in FIG. 4, a server 10A as the first information processing apparatus is connected with a plurality of clients 30A as a second information processing apparatus through a network circuit 2. In the drawing, one client 30A is shown with other clients being omitted. The server 10A comprises a communication interface (communication I/F) 16, a display unit 17, an operation key or a mouse (operation key/mouse) 18 and a CPU 11. In addition, the following portions are characteristic of the invention: a window display condition judging unit 12; a hidden area detecting unit 13; a hidden area management table 14; a hidden area notification unit 15; and a display area management unit 19. The communication interface 16 receives information from the data communication path to be connected with the network line 2 or transmits the information to the data communication path. The CPU 11 conducts the controlling operation of the whole server 10A. The received screen data is processed by the CPU 11 and is displayed on the display unit 17. The display condition of the display unit 17 is changed or the inputting operation of the data is conducted by the operation of the operation key or the mouse 18.

Figure 5:
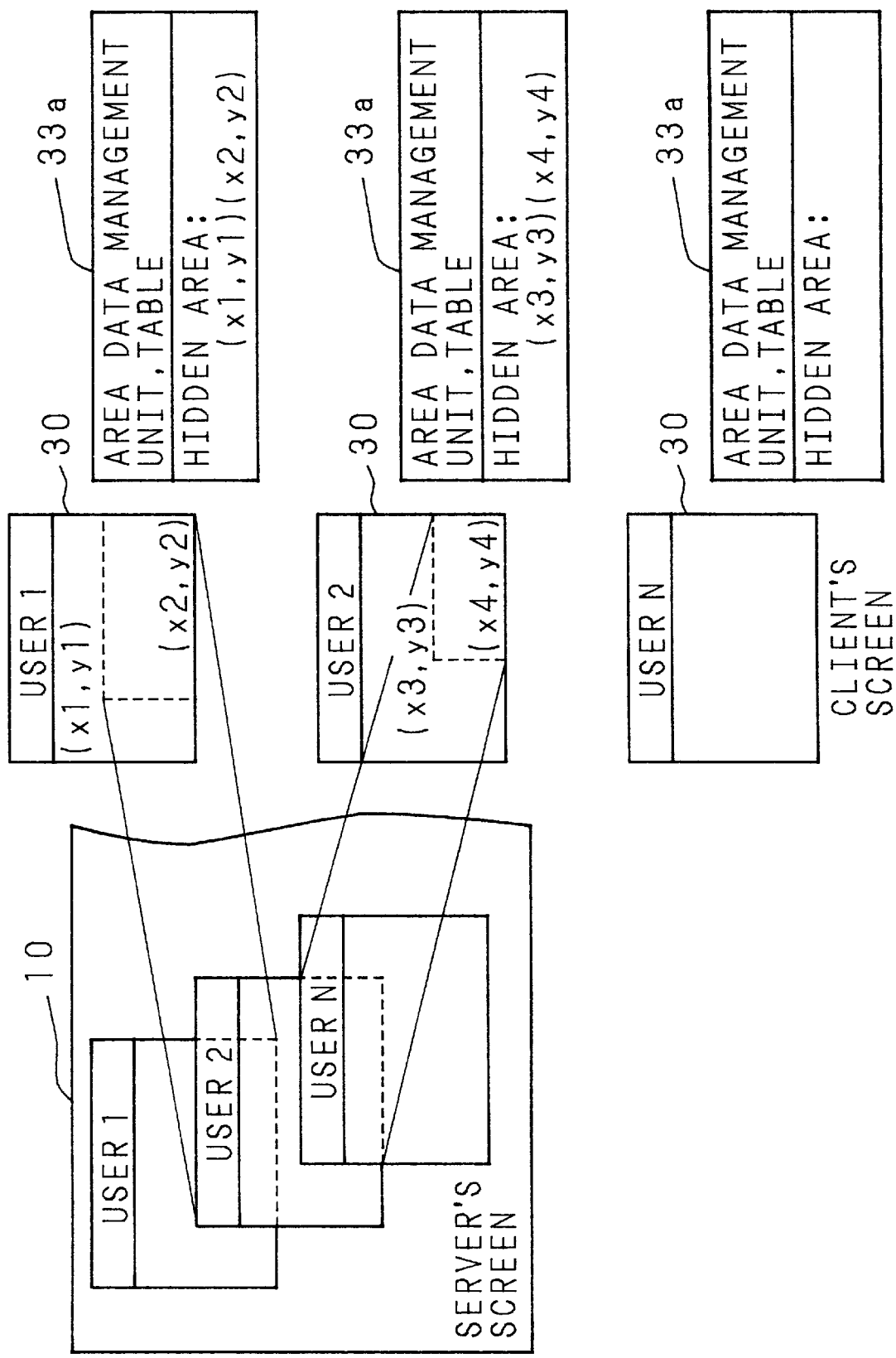
FIG. 5 is a diagram for illustrating a hidden area on the server screen of the first embodiment.

Also, the screen data of a plurality of clients 30A is displayed on the display unit 17. FIG. 5 is a diagram for illustrating the hidden area in the server screen in the first embodiment. As shown, a plurality of clients screens 30, 30 . . . are superposed and are window-displayed on the server screen 10. The client screen 30 which a user N uses is positioned on the uppermost layer on the server screen 10 and the entire area of the screen 30 for the user N is displayed. The client screen 30 of the user 2 is displayed below the layer of the user N, in an embodiment where an area is superposed particularly. The client screen 30 of the user 1 is displayed below the layer of the user 2 in an embodiment where an area is superposed partially.

In a hidden area, i.e. an area with windows being superposed at this situation, the screen data of the client screen 30 on the lower layer is not displayed. For example, the hidden area of the client screen 30 of the user 1 is expressed by (x1, y1) (x2, y2) with the use of coordinates of diagonal vertex, while the hidden area of the client screen 30 of the user 2 is expressed by (x3, y3) (x4, y4). The client screen 30 of the user N has no hidden areas, because all of the screen 30 is displayed. The window display condition judging unit 12 judges the existence of the aforementioned window superposition displayed on the display unit 17 and notifies a hidden area detecting unit 13 when they are superposed. The hidden area detecting unit 13 detects the hidden area of each client screen 30 to notify the hidden area notification unit 15 of the coordinates. The hidden area is rewritably stored for each of the clients in the hidden area management table 14. The hidden area notification unit 15 notifies each client 30A through the network line 2 of the detected hidden area.

Also, the display area management unit 19 manages the display area of each window displayed on the display unit 17. For example, when the CPU 11 changes the window position by based on input from the operating key, the change of window display area is notified to the window display condition judging unit 12, so as to judge the superposed condition of the windows.

The client 30A comprises a communication interface (communication I/F) 35, a display unit 36, an operation key or a mouse (operation key/mouse) 37, a CPU 31 and a memory 32. In addition, the following portions are characteristic of the invention: area data management unit 33; a screen data transmitting unit 34; and a screen data extracting unit 38. The communication interface 35 receives information from the data communication path connected with the network line 2 or transmits the information to the data communication path. The CPU 31 conducts a controlling operation about all the clients 30A. The information inputted by the operation of the operating key or the mouse 18 is processed by the CPU 31 to be displayed on the display unit 36 as the screen data and also, to be stored on the memory 32.

The area data management unit 33 is provided with a table 33a for storing the hidden area. As shown in FIG. 5, the hidden area on the server screen 10 is stored for its rewritable operation in the table 33a of the area data management unit 33. The hidden area of the client screen 30 of the user 1 is expressed by (x1, y1) (x2, y2), while the hidden area of the client screen 30 of the user 2 is expressed by (x3, y3) (x4, y4). The client screen 30 of the user N has no hidden areas, because the whole screen is displayed. The screen data extracting unit 38 extracts only the screen data necessary based on the hidden area stored in the table 33a. The screen data transmission unit 34 transmits to the server 10A through a network line 2 the screen data extracted when the hidden area has been identified, and transmits all the screen data when a hidden area is not identified.

Figure 6:
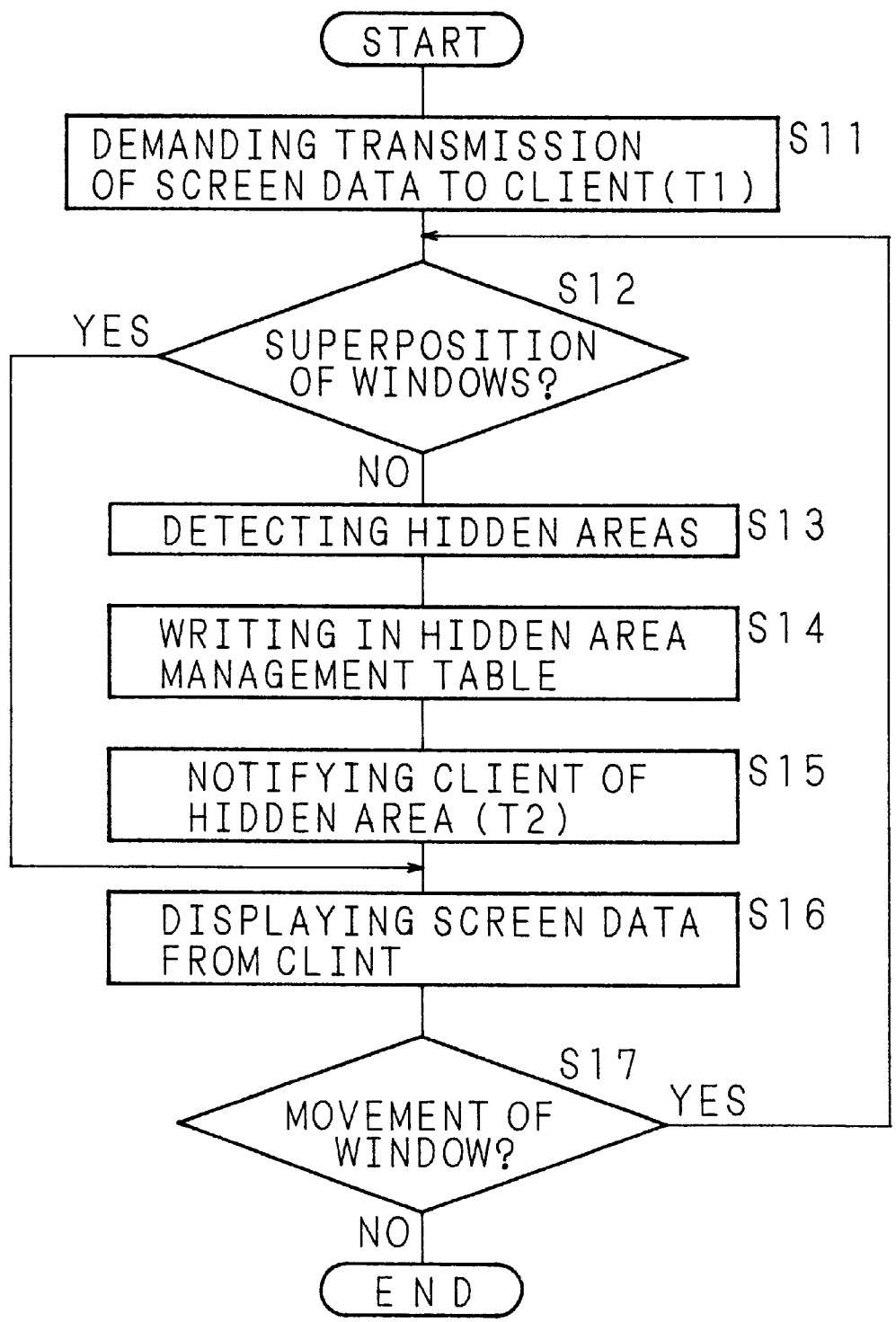
FIG. 6 is a flow chart showing the processing procedures for the server in the first embodiment.
Figure 7:
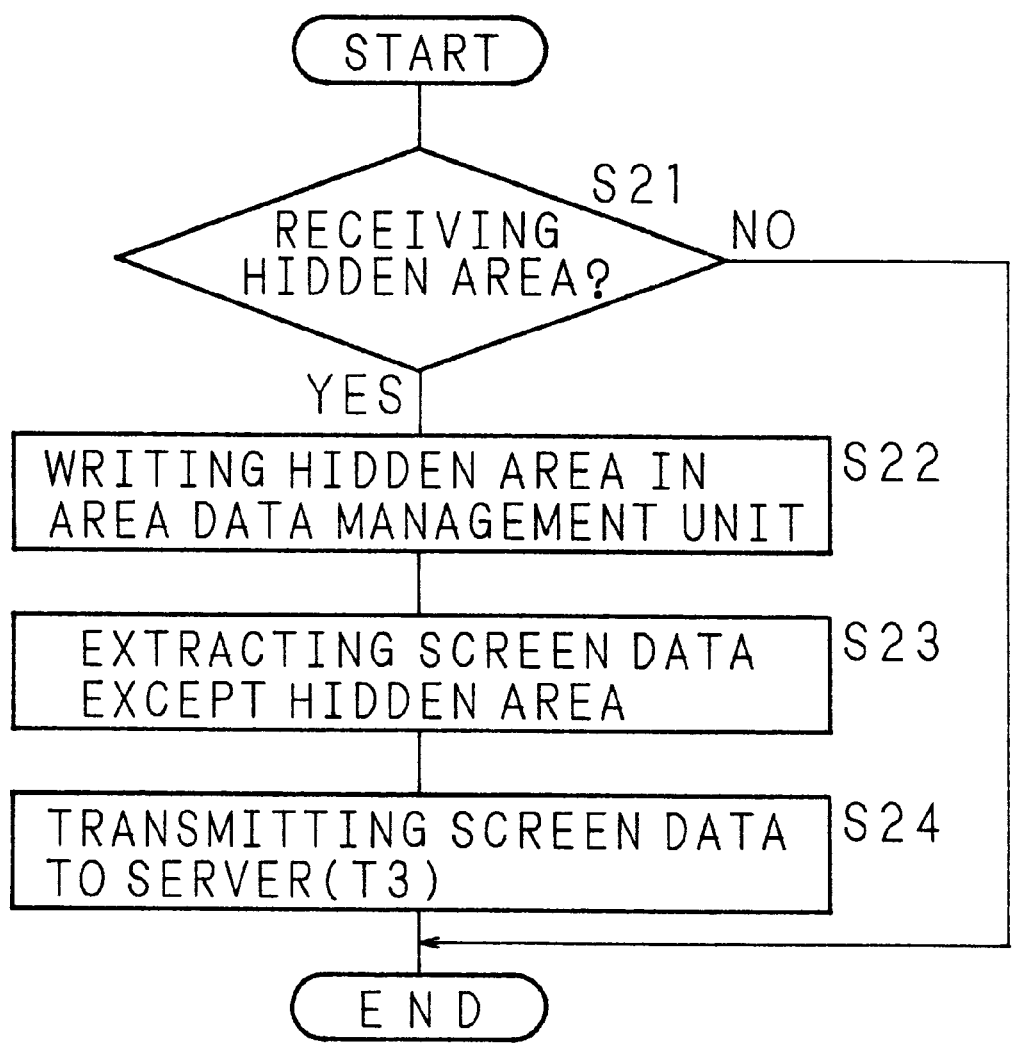
FIG. 7 is a flow chart showing the processing procedures for the client in the first embodiment.

With the data transmission controlling system described above, the procedures of controlling operation when the screen data of the client 30A is transmitted to the server 10A will be described hereinafter. FIG. 6 is a flow chart showing the processing procedures for the server in the embodiment. FIG. 7 is a flow chart showing the processing procedures for the clients in the embodiment.

At a time point T1 as shown in FIG. 6, a transmitting operation of the screen data is demanded from a client by an instruction of the CPU 11 of the server 10A (at step S11). Then, it is judged (at step S12) whether or not the windows are displayed through superposition by the window display condition judging unit 12. When they are superposed, the hidden areas are detected (at step S13) by the hidden area detecting unit 13, so as to write in the hidden area management table 14 (at step S14). At a time point T2, the hidden area is notified to a client 30A by the hidden area notifying unit 15 (at step S15).

As shown in FIG. 7, the client 30A (at step S21) having received the hidden area from the server 10A writes (at step S22) in the table 33a of the area data management unit 33. Then, the screen data extracting unit 38 extracts (at step S23) the screen data, except for screen data corresponding to the hidden area, stored in the table 33a. At a time point T3, the screen data transmitting unit 34 transmits tile screen data extracted to the server 10A (at step S24). As shown in FIG. 6, the server 10A displays the received screen data (at step S16). Also, when it has been judged that the windows are not superposed at a step S12, the screen data transmitted from the client is displayed without detection of the hidden area (at step S16).

Figure 8:
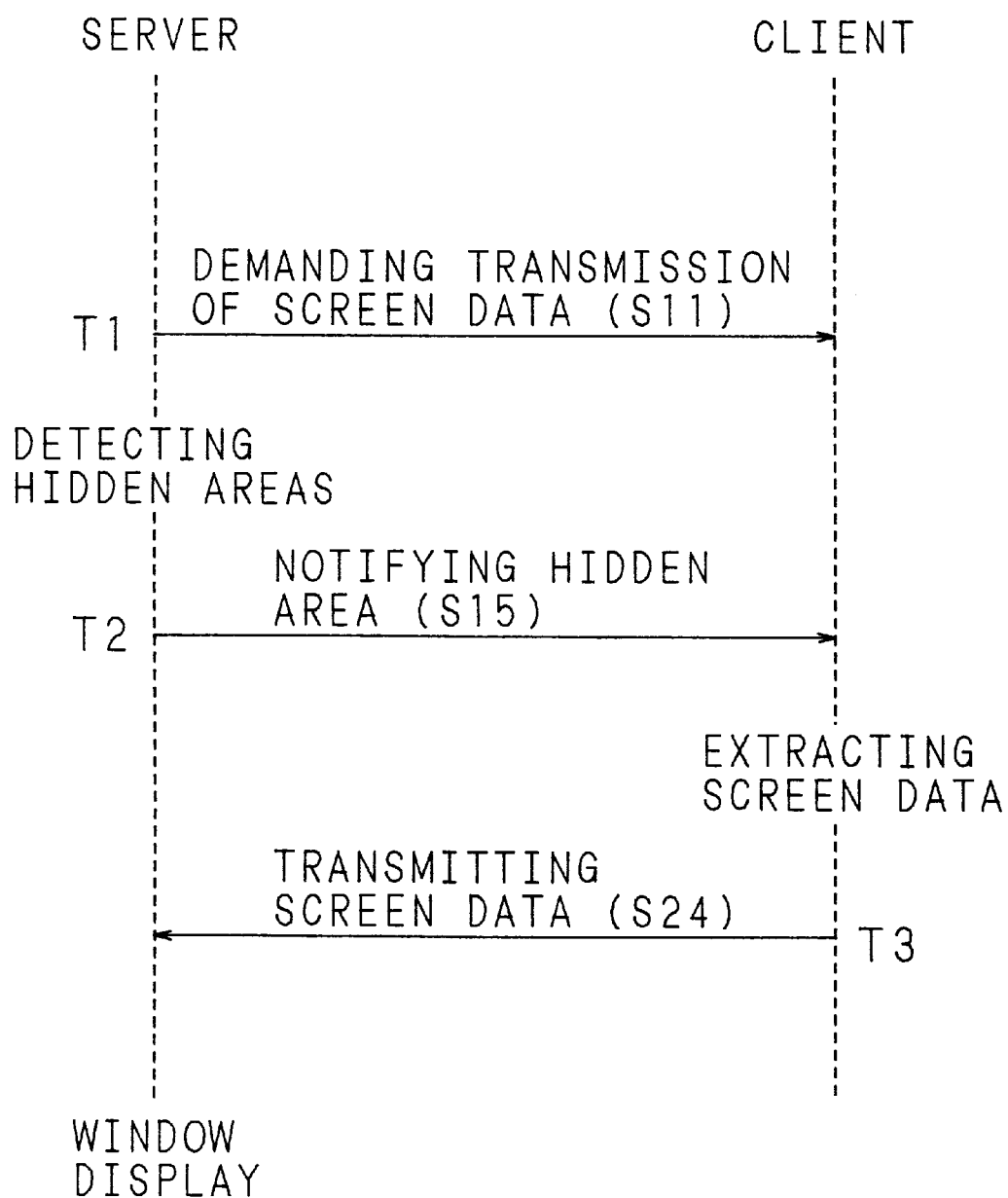
FIG. 8 is a diagram showing the condition transition for the data transmission controlling system in the first embodiment.

FIG. 8 is a diagram showing such a condition transition for the processing procedures. As described above, the screen data transmission has been demanded from the server 10A at the time point T1, and then, the hidden area is detected, and the hidden area is notified to a client 30A at the time point T2. In the client 30A, the screen data except screen data corresponding to the hidden area is extracted. The screen data extracted at the time point T3 is transmitted to the server 10A and is displayed.

Then, processing procedures in a case where the window display of the server screen has been changed will be described hereinafter. The display area management unit 19 of the server 10A judges (at step S17) whether or not the window has been moved. When the window has been moved, the step returns to the step S12 to judge whether or not the window is superposed, so as to detect the changed hidden area (at step S13). At a step S14, the changed hidden area is rewritten in the hidden area management table 14, so as to notify (at step S15) the client 30A of the changed hidden area. The client 30A receives the changed hidden area to rewrite (at step S22) in the table 33a of the area data management unit 33 and transmits (at step S24) the screen data, except for screen data corresponding to the changed hidden area, to the server 10A.

The server 10A, connected with a plurality of clients 30A, 30A . . . , conducts the aforementioned data transmission controlling for each of clients 30A.

Since the screen data, except for screen data not displayed due to the windows superposed, among the screen data of the clients 30A is transmitted to the server 10A, the data amount to be transmitted can be reduced to a minimum requirement and the displaying of the screen data can be conducted quickly. When the hidden area has been changed through moving of the windows on the server screen, the screen data is extracted based on the changed hidden area. The necessary screen data can be extracted in accordance with the displaying condition of the server screen and the transmission zone can be effectively used.

In the aforementioned embodiment, when the hidden area is changed, the screen data of the changed hidden area is extracted from the whole screen data. This is not restricted to this operation. Only screen data corresponding to the change part of the hidden area can be added to or removed from the screen data transmitted under the existing conditions.

In the aforementioned embodiment, the client screen 30 is superposed on only one window and the hidden area is one area. Actually a plurality of hidden areas can be sometimes provided with the client screen image being superposed on a plurality of windows. In such a case, such a processing operation can be effected so that screen data corresponding to the respective hidden areas are excepted from the whole screen data to extract only the screen data to be displayed.

In the aforementioned embodiment, a table with the hidden areas being stored therein is provided in both the server 10A and the client 30A. This is not restricted to this case. Or the table can be provided in either of them. In this case, it is processed so that the detected hidden area may be notified to the terminal where the table is provided.

When the predetermined factor or more of the client screen 30 is in the hidden area, a processing operation can be conducted so that all the screen data may not be transmitted with the whole area of the screen as the hidden area. For example, when the substantial activity of the system is not conducted even if less than 20% of the screen data is displayed, the hidden area is notified as the whole screen when 80% or more of the whole screen is hidden area. Thus, since unnecessary screen data is not transmitted, the transmission data amount is reduced and the display of the client screen image becomes quicker.

Second Embodiment

Figure 9:
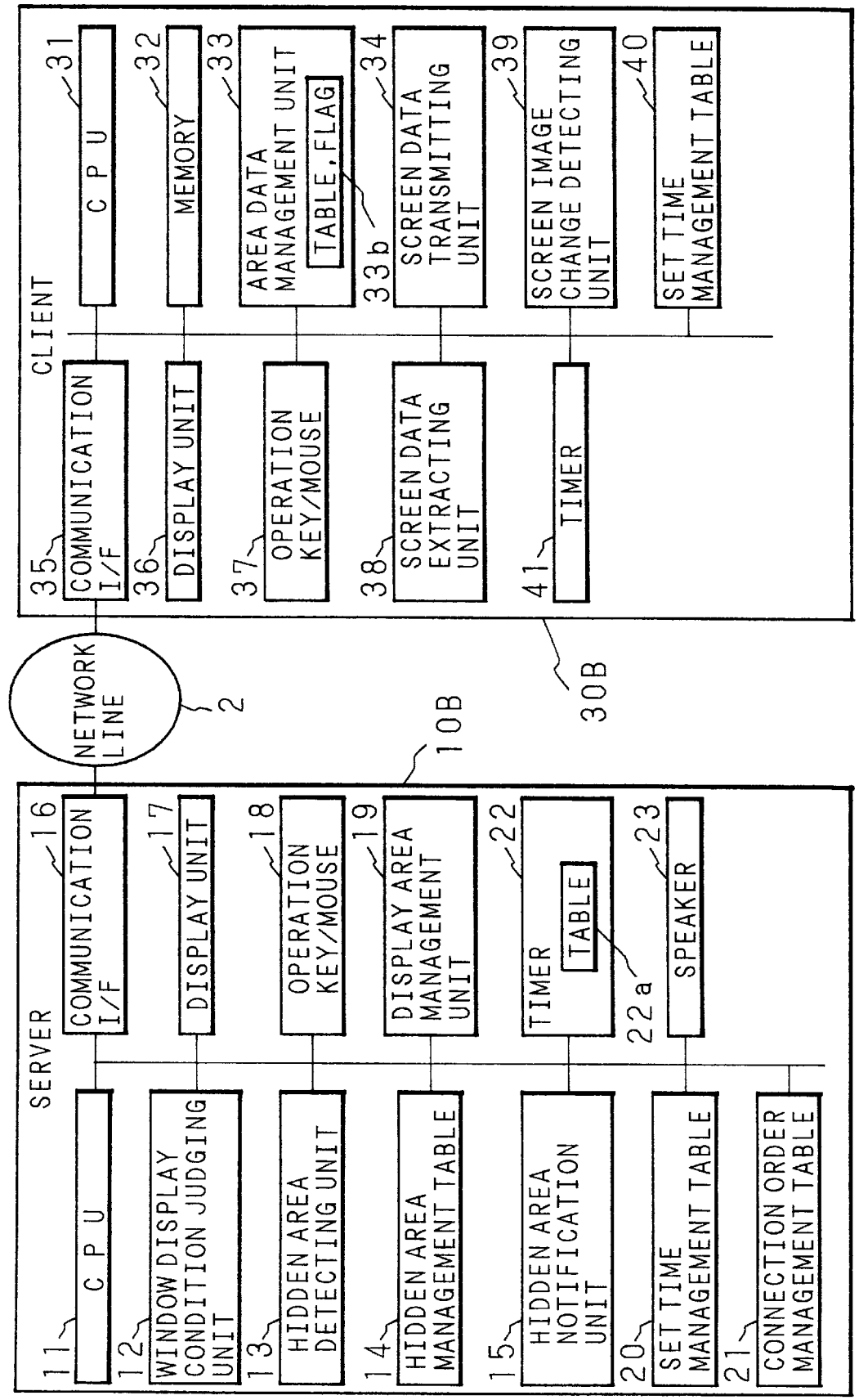
FIG. 9 is a diagram of the data transmission controlling system in a second embodiment.

FIG. 9 is a diagram showing a configuration of the data transmission controlling system in the second embodiment, the system aimed at the remote educational communication. As shown in FIG. 9, a server 10B is connected with a plurality of clients 30B through a network line 2. In the drawing, one client 30B is shown, with other clients being omitted. The server 10B comprises a set time management table 20, a connection order management table 21, a timer 22, and a speaker 23. The other configurations of the server 10B are similar to those of the first embodiment, with the same reference numerals being given to the same units. The description thereof is omitted.

Figure 10:
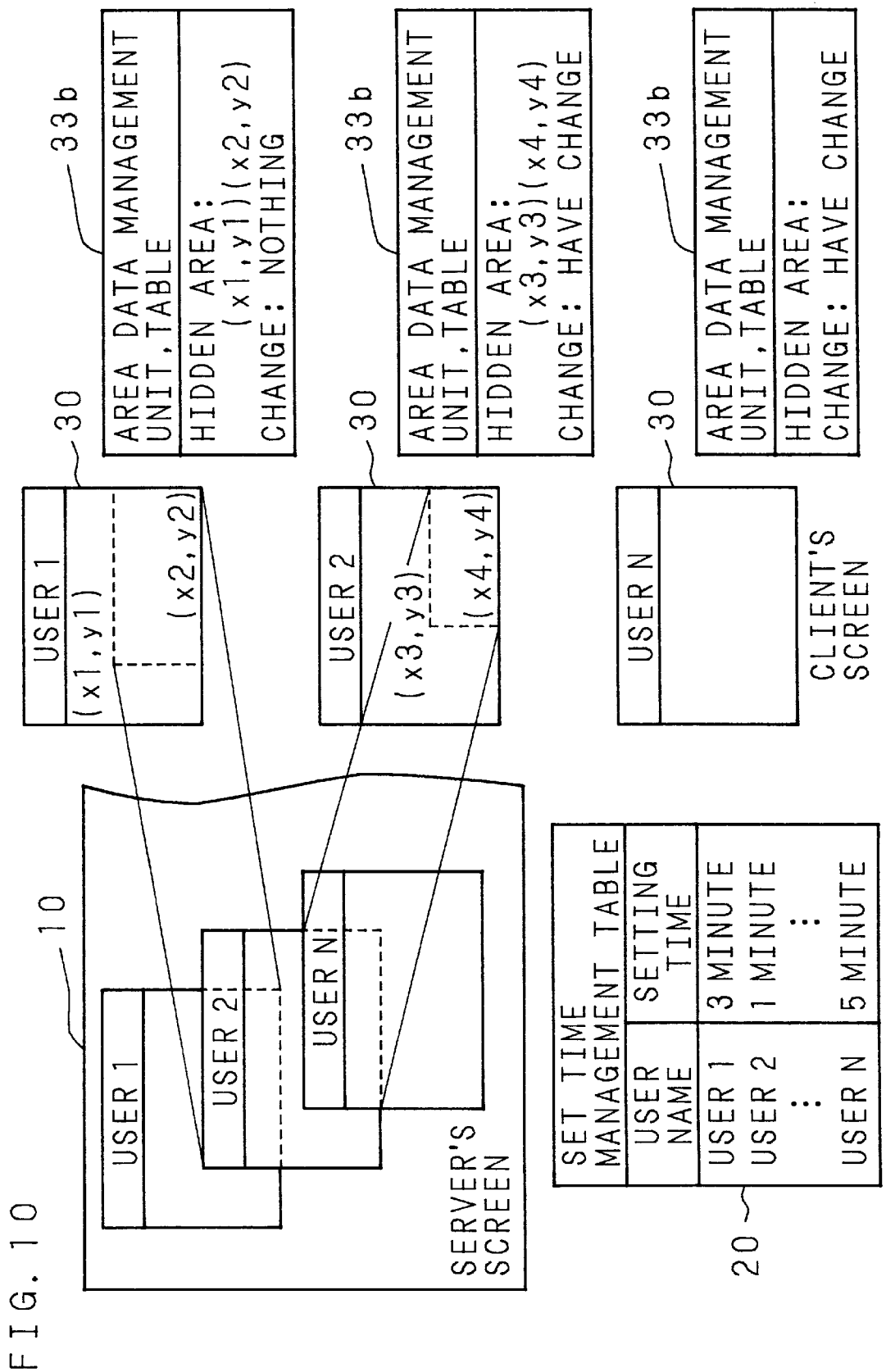
FIG. 10 is a diagram for explaining a hidden area on the server image in the second embodiment.

FIG. 10 is a diagram for illustrating the hidden area of the server screen in the second embodiment. As shown in the drawing, a plurality of clients screens 30 and 30 . . . are window-displayed, as in the first embodiment, on the server screen 10 with the hidden area being formed in the window-superposed area. A setting time for each of the clients (user name) is stored in the set time management table 20 of the server 10B. An order connected with the server 10B of the clients 30B is stored in the connecting order management table 21. The timer 22 has a table 22a and can measure the setting time for each of the clients. Also, the speaker 23 can notify of messages in accordance with the notification from the clients 30B.

As shown in FIG. 9, the client 30B comprises an area data management unit 33, a timer 41, a screen change detecting unit 39, and a set time management table 40. The other configurations of the clients 30B are similar as those of the first embodiment. The description thereof will be omitted with the same reference numerals being given to the same units. The area data management unit 33 is provided with a table 33b having a flag. As shown in FIG. 10, the flag notifying of the existence of the change in the screen data and the hidden area are stored in the table 33b, and the flag is erected when the screen data changes. The setting time according to the various conditions is stored in the set time management table 40, and the timer 41 measures the setting time. The screen image change detecting unit 39 detects the change in the screen data of the whole screen data of the client 30B, such as a change when letters are displayed on the screen or the window size or the condition position has been changed.

Figure 11:
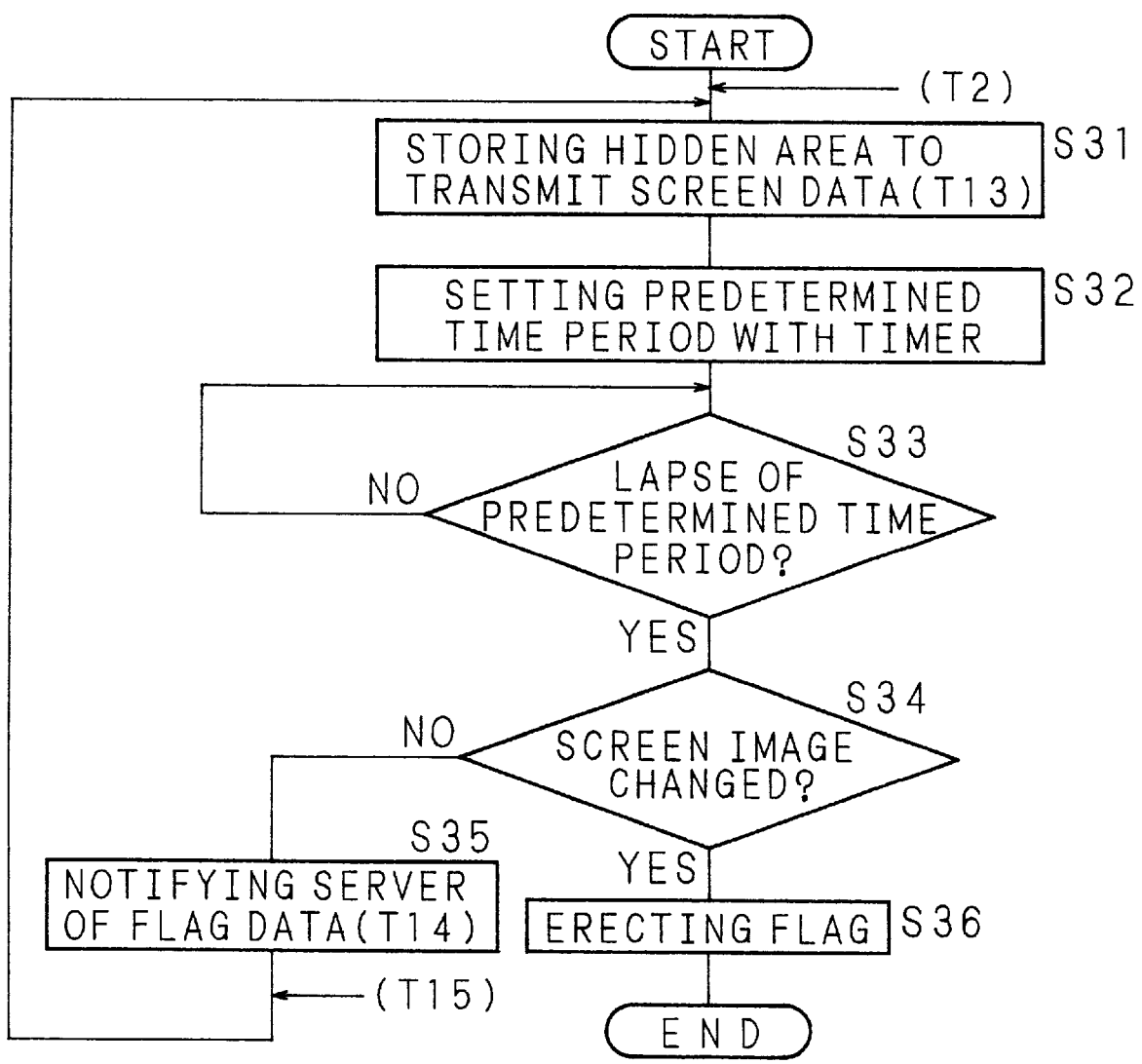
FIG. 11 is a flow chart showing the processing procedures for the client in the second embodiment.
Figure 12:
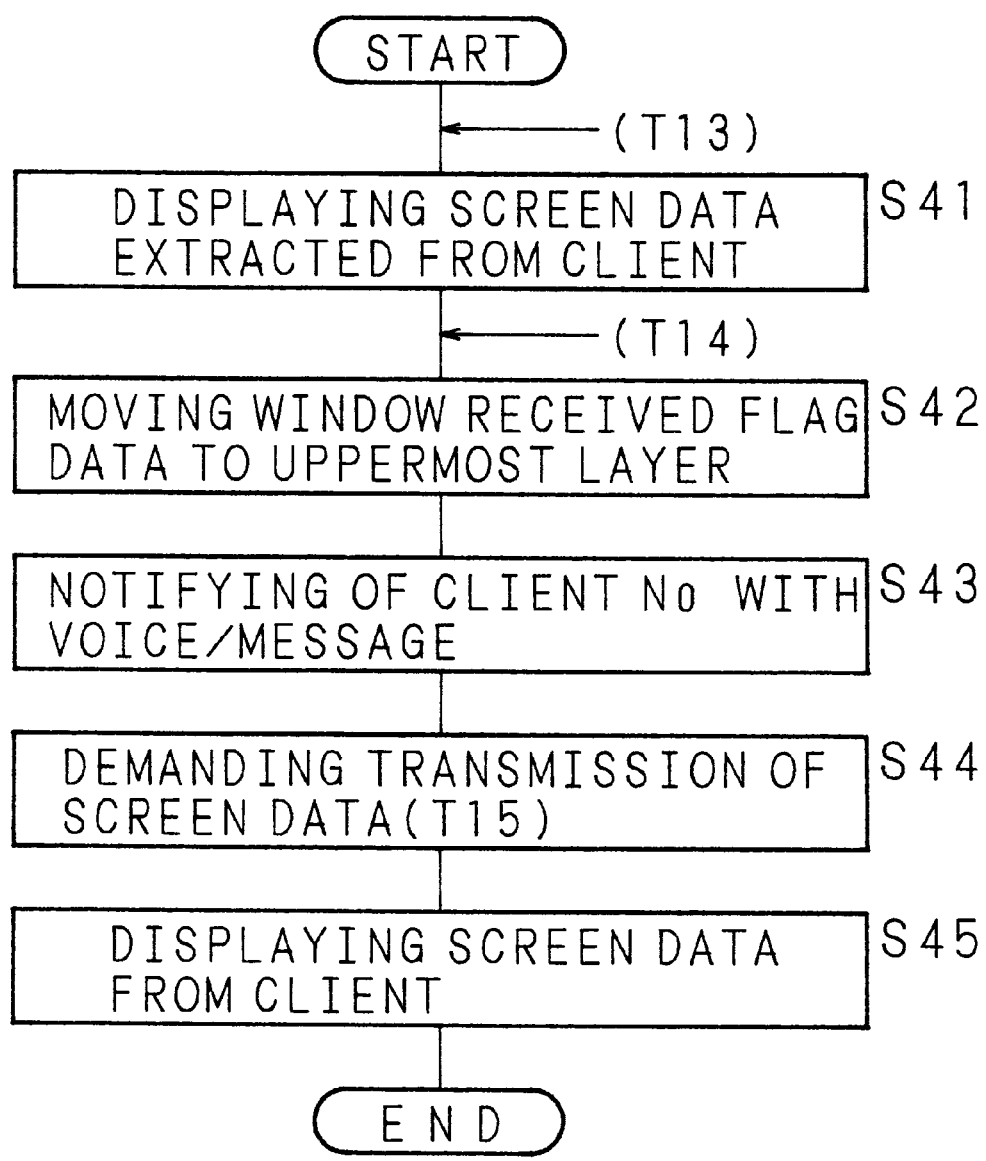
FIG. 12 is a flow chart showing the processing procedures for the server in the second embodiment.

The procedures for the controlling operation when the screen data of the client 30B is transmitted to the server 10B with the user of the data transmission controlling system constructed as described above will be described hereinafter. FIG. 11 is a flow chart showing the processing procedures for clients in the embodiment. FIG. 12 is a flow chart showing the processing procedures for the server in the embodiment. In the second embodiment, when the superposed windows are displayed by the server screen, the client extracts the screen data except screen data corresponding to the hidden area, and effects a controlling operation to transmit the extracted screen data to the server. The processing procedures are similar to those of the first embodiment. The description thereof will be omitted.

As shown in FIG. 11, at a time point T13, the client 30B stores in the table 33b the hidden area notified from the server 10B, so as to transmit the extracted screen data to the server 10B (at step S31). As shown in FIG. 12, the server 10B receives the screen data from the client 30B, so as to display it on the screen (at step S41).

The client 30B measures (at step S32) with a timer 41 the setting time stored in the set time management table 41, after the lapse of the predetermined time period (at step S33), so as to detect (at step S34) whether or not the screen image of the client 30B has been changed by the screen change detecting unit 39. When the screen image has been changed, the flag of the table 33b is erected (at step S36). When the screen image has not been changed, without erection of the flag at a time point T14, the flag data is notified to the server 10B (at step S36).

At a time point T14, the server 10B which has received the flag data moves (at step S42), the window of the client 30B, having notified the flag data, to the uppermost layer to cause a voice or a message from a speaker 23 to speak, so as to notify (at step S43) of the client number. Thus, the user of the server 10B can recognize which client does not change the screen data within the predetermined period. The server 10B demands (at step S44) the screen data of the client 30B at a time point T15. The client 30B receives the demand from the server 10B and extracts the screen data as in the first embodiment at a step S31, so as to transmit it to the server 10B. The server 10B displays the transmitted screen data (at step S45).

When the screen of the client in the predetermined time is not changed, since that is notified to the server by such a data transmission controlling operation, the user of the server can know promptly that which client has not changed the screen data. Although the server 10B tells of the client after the window has been caused to move to the uppermost layer at a step S42 and at a step S43, the operation is not limited to them only. Only either of them will do. Also, the notification of the client can be conducted through not only speaking of the voice or the message, but also, processing such as window blinking, window discoloration, etc.

FIG. 11 and FIG. 12 describe the processing procedures in the notifying operation of the screen image change from the client to the server, which is not the only procedure. For example, the notification of the screen image change may be demanded from the server to the client. The processing procedures in this case will be described hereinafter.

Figure 13:
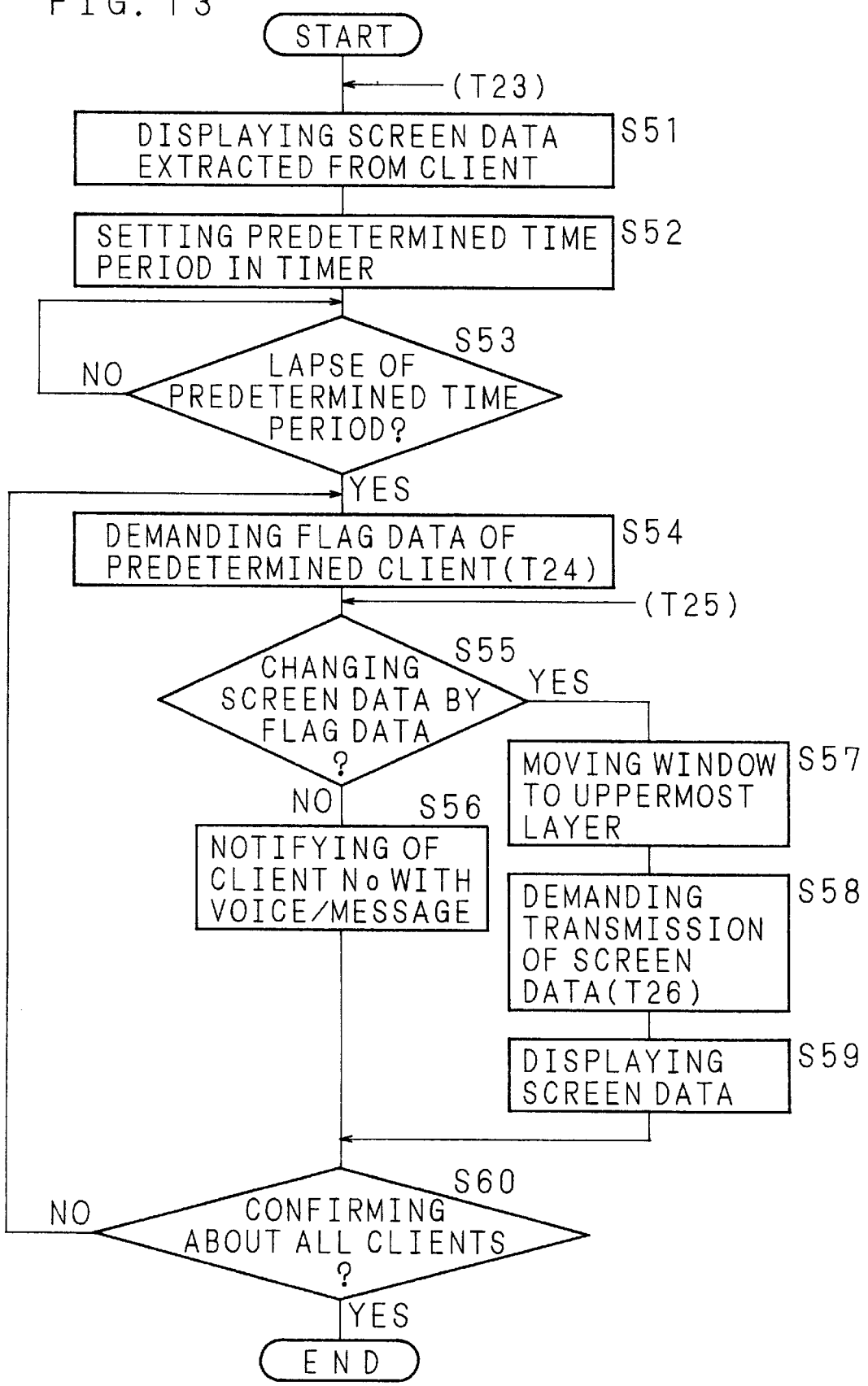
FIG. 13 is a flow chart showing other processing procedures for the server in the second embodiment.
Figure 14:
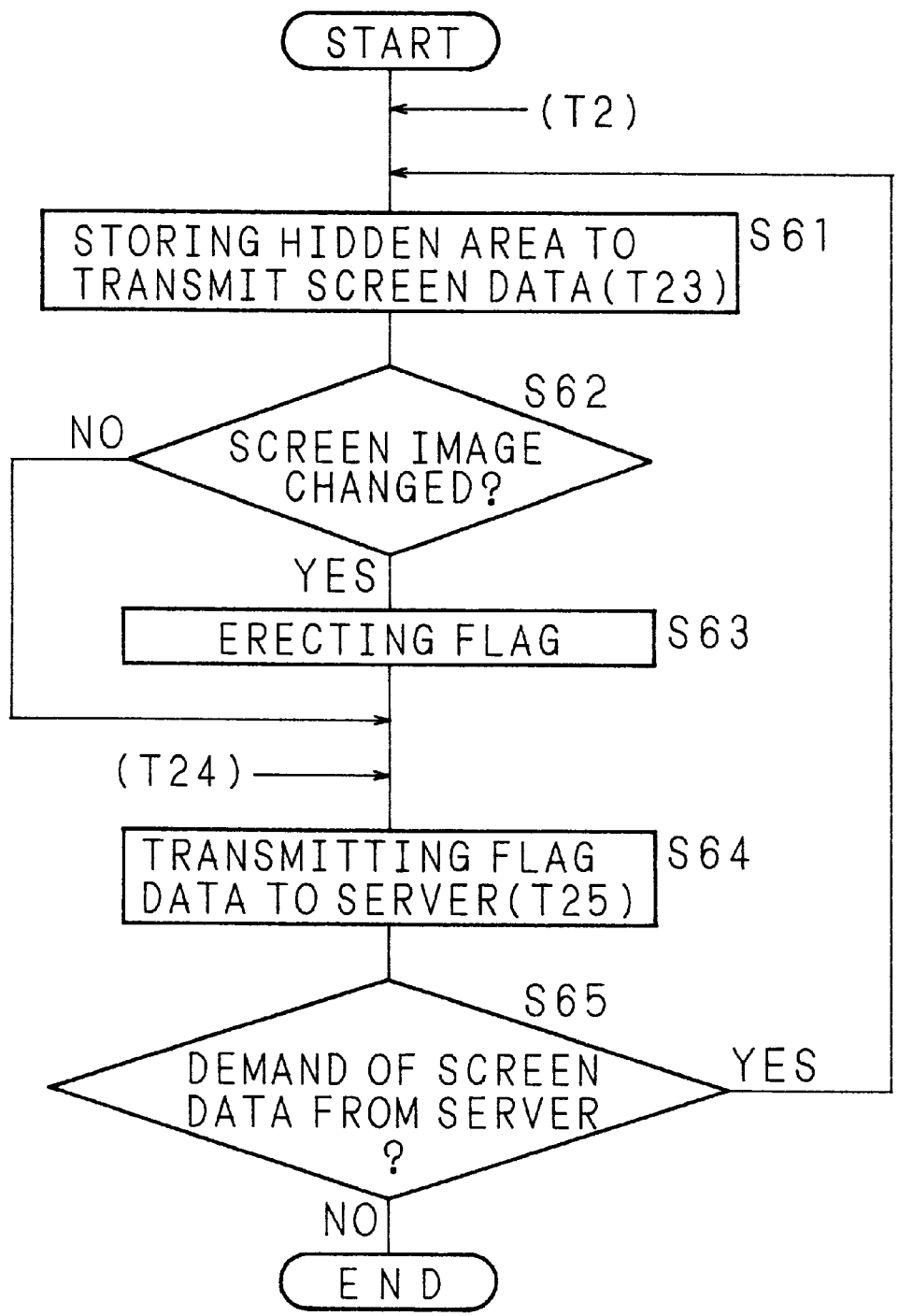
FIG. 14 is a flow chart showing other processing procedures of the client in the embodiment.

FIG. 13 is a flow chart showing the processing procedures for a server when the notification of the screen image change is demanded from the server to the client. FIG. 14 is a flow chart showing the processing procedures of a client in this case. When the windows are superposed and displayed on the server screen, the data transmission processing operation is conducted as in the first embodiment with the description thereof being omitted.

As shown in FIG. 14, at a time point T23, the client 30B stores in the table 33b the hidden area notified from the server 10B to transmit (at step S61) the extracted screen data to the server 10B. As shown in FIG. 13, the server 10B receives the screen data from the client 30B and displays (at step S51) it on the screen. The predetermined time set in the predetermined client is measured with the timer 22 based on the set time management table 20 (at step S52). The timer 22 has the table 22a and can measure the respective setting times of a plurality of clients. After the lapse of the predetermined time (at step S53), at a time point T24, the flag data of the area data management unit 33 which the client has, is demanded (at step S54).

After the screen data has been transmitted (at step S61), the client 30B judges (at step S62) the screen image change by the screen change detecting unit 39. When the screen image has been changed, the flag in the table 33b of the area data management unit 33 is erected (at step S63). When the screen image has not been changed, the flag is not erected. When the flag data is demanded from the server 10B at the time point T24, the client transmits the flag data to the server 10B (at step S64) at a time point T25. Then, the process returns to a step S61 so that when the screen data has been demanded from the server 10B, the screen data is transmitted based on the hidden area.

When it is judged (at step S55) that the screen image has not been changed within the predetermined time by the flag data transmitted at a time point T25, the voice or the message is spoken to indicate a client number (at step S56). Thus, the user of the server 10B can recognize which client 30B has not changed the screen data within the predetermined time. It is judged (at step S60) whether or not the existence of the screen image change has been confirmed about all the clients. In an order based on the connecting order management table 21, a flag data is demanded (step S54) to a client who has not judged yet.

When it is judged that the screen image has been changed at a step S55, the window displaying the screen data of the client is caused to move to the uppermost layer (at step S57). At a time point T26, the transmission of the screen data is demanded to the client 30B (at step S58), and the received screen data is displayed (at step S59). The confirmation of the screen image change is conducted about all the clients (at step S60).

When no changes have been conducted within the predetermined time on the screen of the client by the aforementioned data transmission controlling operation, the user of the server can know as soon as possible which client does not change the screen data. Since the window of the client where the screen image has been changed is caused to move to the uppermost layer, the server can react quickly to the screen image change of the client. Further, since the respective setting times by a plurality of clients are measured on the server, and the notification of the change in the respective screen data is demanded by the server, the controlling operation of the window displaying operation is likely to be conducted about a plurality of clients.

Although the set time management table is provided by both the server 10B and the client 30B in the aforementioned second embodiment, only either of them will do. Although a timer is provided on both the server 10B and the client 30B, only either of them will do. The setting time of the timer can be set for each of the clients as described above, and the common setting time may be set in all the clients. The demand of the notification about the screen data change can be conducted in the connection order as described above or in an alphabet order or an optional client order. The demand has only to be conducted in an order stored in a table like a connecting order management table 21.

Third Embodiment

Figure 15:
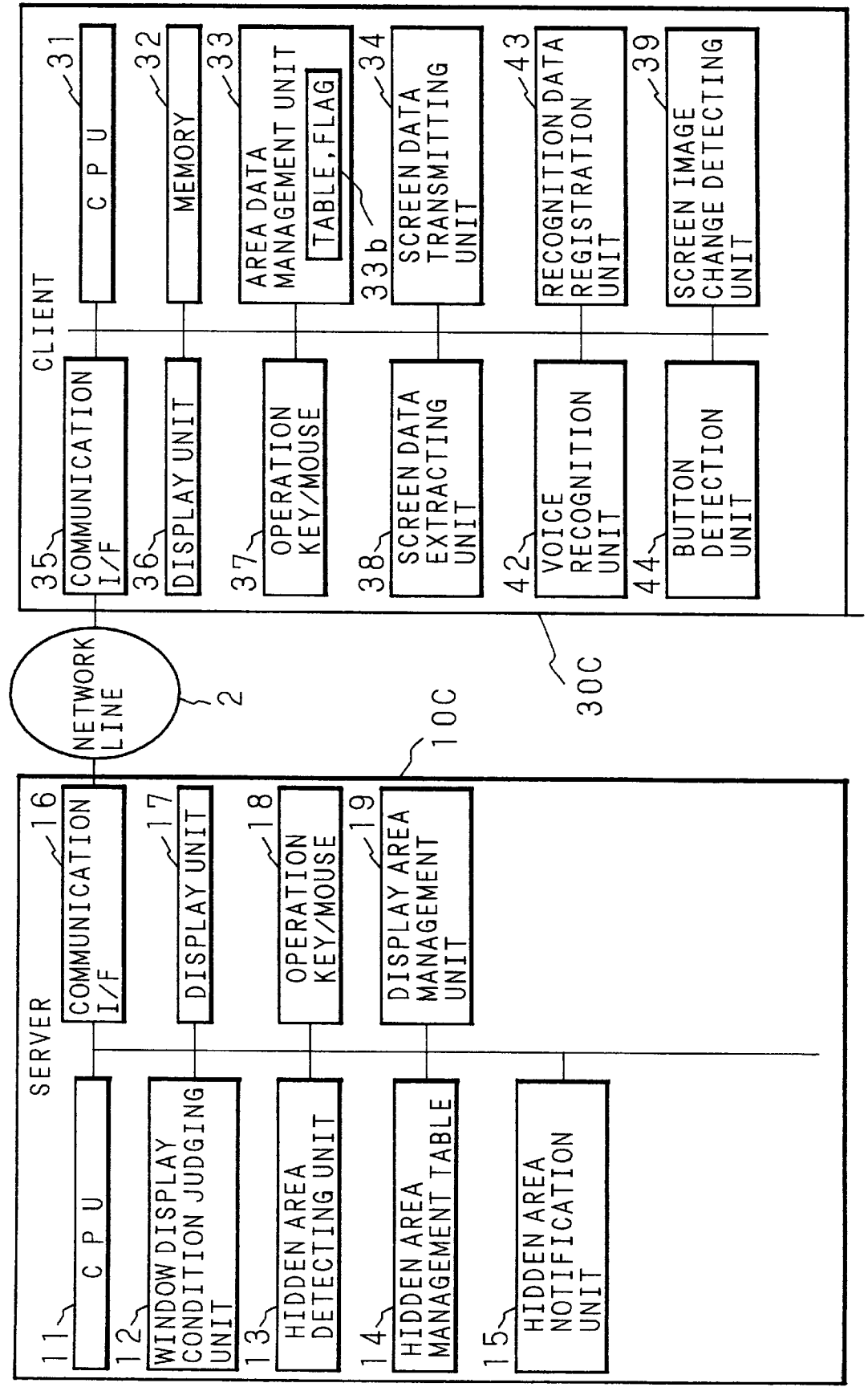
FIG. 15 is a diagram showing the configuration of the data transmission controlling system in a third embodiment.

FIG. 15 is a diagram showing a configuration of the data transmission controlling system in the third embodiment with the remote educational communication being an object. As shown in FIG. 15, a server 10C is connected with a plurality of clients 30C through a network line 2. In the drawing, one client 30C is shown with other clients being omitted. The server 10C has configurations similar to those of the first embodiment. The description thereof is omitted, because the same reference numerals are given to the same units.

The client 30C has an area data management unit 33, a voice recognition unit 42, a button detecting unit 44 and a recognition data registration unit 43. The other configurations of the client 30C are similar to those of the first embodiment. The description thereof will be omitted, because the same reference numerals are given to the same units. The area data management unit 33 is provided with a table 33b having a flag. A flag indicating the existence of the screen data change and a hidden area are stored in the table 33b and the flag is erected when the screen data has been changed. When the voice recognition unit 42 recognizes the voice which the user of the client 30C has spoken and the voice is a voice registered in the recognition data registration unit 43, it judges that the user of the client 30C has shown some action, so as to notify the server 10C of it. The button detecting unit 44 detects that a question button provided on the window of the client has been operated and judges that the user of the client 30C has shown some action, so as to notify the server 10C of it.

Figure 16:
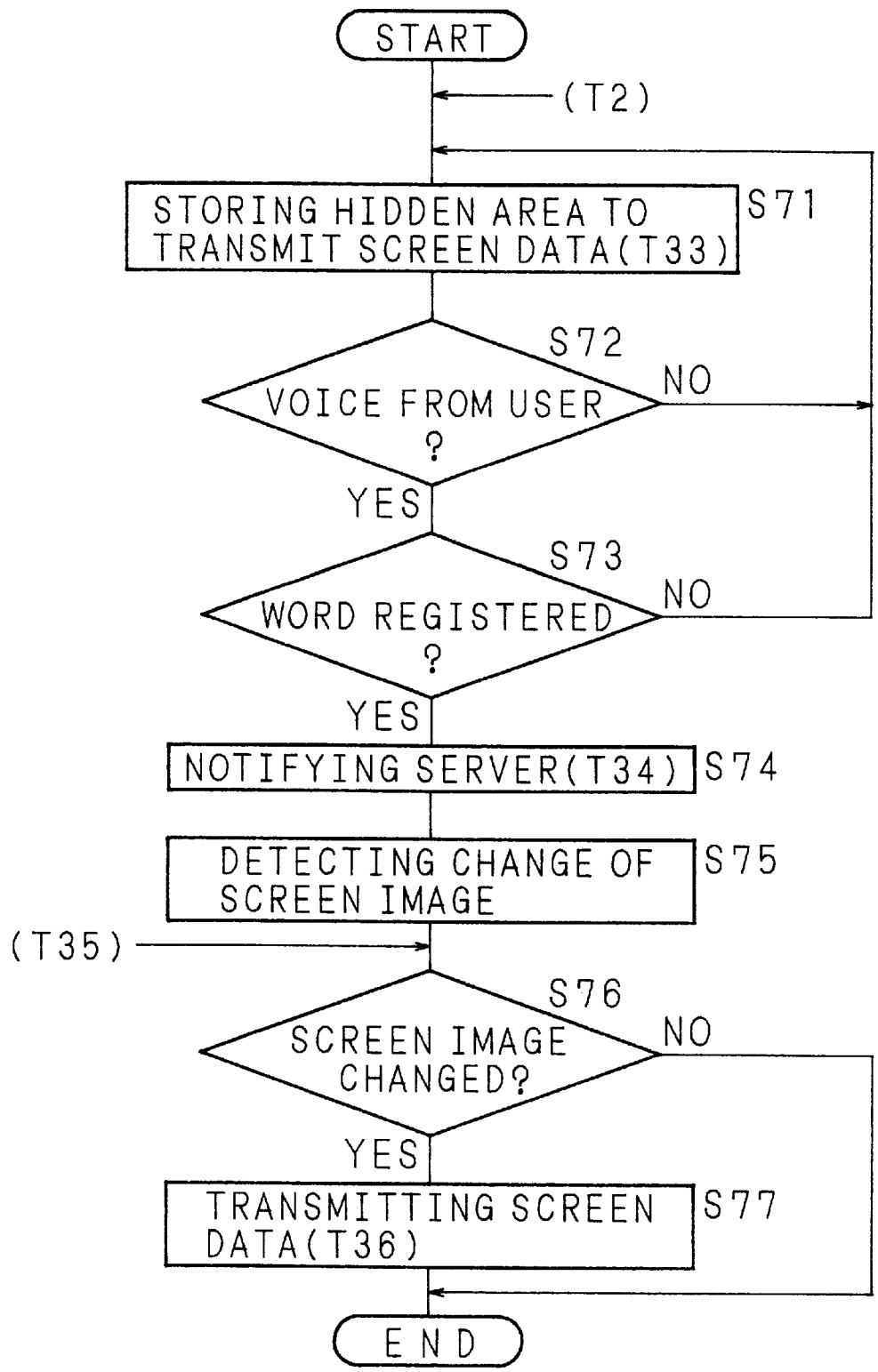
FIG. 16 is a flow chart showing the processing procedures for the client in the third embodiment.
Figure 17:
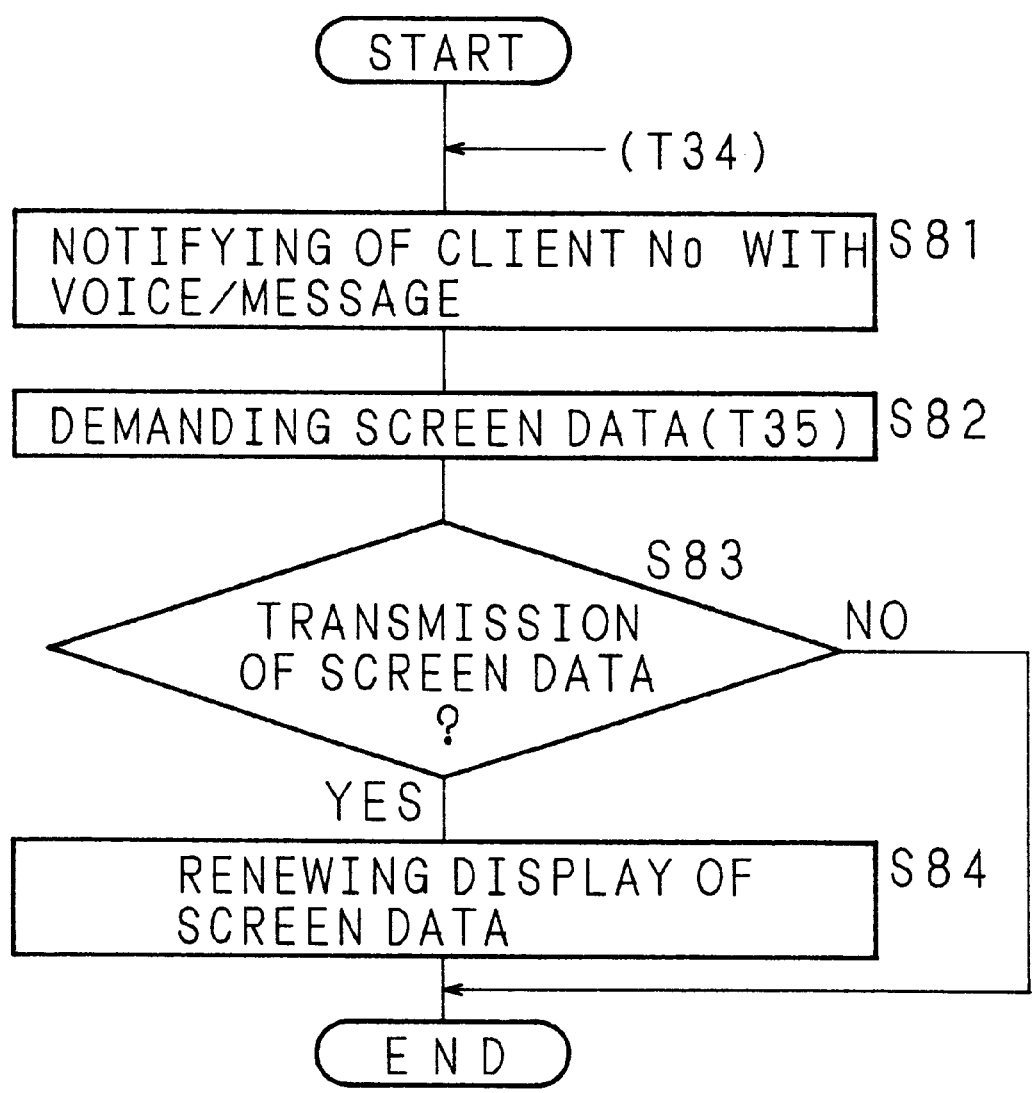
FIG. 17 is a flow chart showing the processing procedures for the server in the third embodiment.

The procedures for the controlling operation when the screen data of the client 30C is transmitted to the server 10C by the user of the data transmission controlling system constructed as described above will be described hereinafter. FIG. 16 is a flow chart showing the processing procedures for clients in the embodiment. FIG. 17 is a flow chart showing the processing procedures for the server in the embodiment. In the third embodiment, when the superposed windows are displayed by the server screen, the controlling operation is effected so that the client may extract the screen data except screen data corresponding to the hidden area, so as to transmit the extracted screen data to the server. The processing procedures are similar to those of the first embodiment. The description thereof will be omitted.

As shown in FIG. 16, at a time point T33, the client 30C stores in the table 33b the hidden area notified from the server 10C, so as to transmit the extracted screen data to the server 10C (at step S71). When the voice from the user is detected (at step S72) by the voice recognition unit 42 after the screen data has been transmitted, it is judged (at step S73) whether or not the detected word is a word, registered in the recognition data registration unit 43, such as "question", "Excuse me" or the like. When the word is a registered word, it is notified to the server 10C at a time point T34 (at step S74). Then, the screen image changes are detected (at step S75) by the screen change detection unit 39. When the screen has been changed, the flag of the area data management unit 33 is erected as in that of the second embodiment. When the screen has not been changed, the flag is not erected.

At a step S72 and a step S73, a processing operation may be conducted to judge whether or not an operation of a question button has been detected by the button detecting unit 44, instead of voice to be recognized. By the operation of the question button, it is notified to a server 10C that the user of the client has shown an action. The operation of the question button cannot always be detected. Furthermore, whether or not the user of the client has operated a completion button, when the input processing operation has been completed, can be detected. The operation can be processed to notify the server 10C of it.

The server 10C having received the notification of the voice from the client 30C makes the voice or the message speak as shown in FIG. 17, to notify of a client number (at step S81). Thus, the user of the server 10C can recognize the user of which client 30C has shown the action. The server 10C demands (at step S82) the screen data to the client 30C shown some action at a time point T35. When the screen image changes after the screen data is demanded by the server 10C (at step S76), the client 30C transmits the screen data (at step S77). When the screen image is not changed (at step S76), the screen data is not transmitted. The server 10C judges (at step S83) whether or not the screen data has been transmitted from the client 30C. When the screen data has been transmitted, the display of the screen data is renewed (at step S84). When the screen data has been transmitted, the displaying of the screen data can be renewed and also, the window of the client can be moved to the uppermost layer.

When the user of the client has shown the action of question, completion or the like by the data transmission controlling operation as described above, the user of the server can know it as soon as possible whether or not the user of which client is questioning or the operation is completed. Also, when the screen data of the client showing the action of question or the like is changed, the screen data is transmitted and the display is renewed so that the user of the server can cope quickly with the question from the client. Since the transmission operation is not effected when the screen data is not changed, the transmission zone can be effectively used with the transmission data amount being reduced.

In a third embodiment, when the user of the client has shown actions of questioning and completion or the like, the notification of the client is conducted by the speaking of the voice or the message, and is not always. Further, the processing operation such as window blinding, window discoloring can be conducted.

In the above described first through third embodiments, the remote education communication system is described by way of an example. The operation is not restricted to it. An applying operation can be conducted to the data transmission controlling operation between a plurality of information processing apparatuses connected with each other through a network, thus achieving similar effects.

The aforementioned first through third embodiments are described as having a transmission system where the screen data is always transmitted to the server from the client after the communication has been started. The applying operation can be conducted by any transmission system of the data. Similar effects can be achieved even by the intermittent transmitting system, for example, where the screen data can be transmitted only for the predetermined period.

The processing procedures explained in the aforementioned first through third embodiments can be realized by causing a general computer system to read the computer program from a recording medium.

Figure 18:
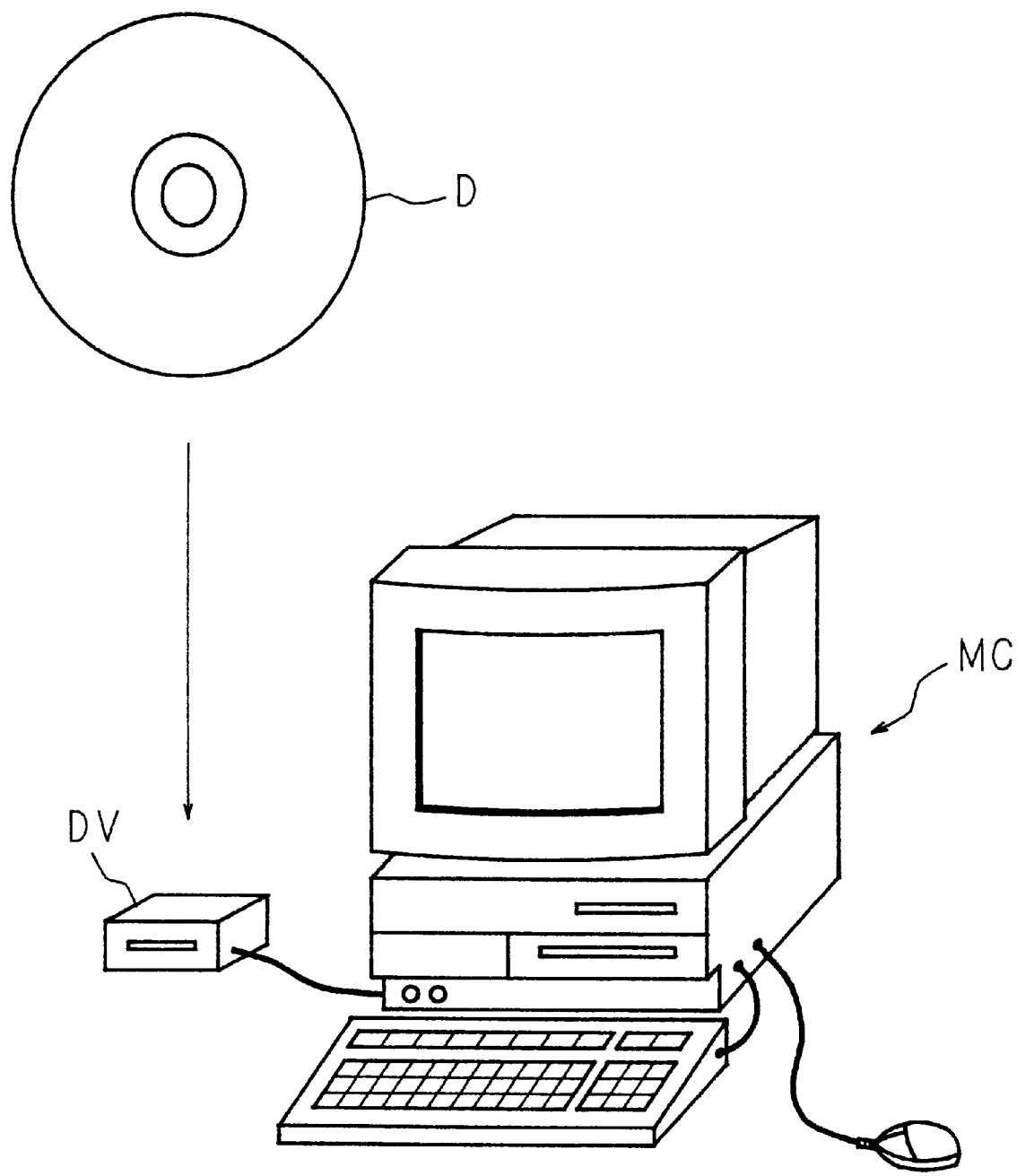
FIG. 18 is a schematic view showing a recording medium where a computer program for realizing the data transmission controlling method of the invention is recorded.

FIG. 18 is a schematic view showing the outer appearance of the computer system MC like the aforementioned server and the recording medium D as the computer memory product. The recording medium D is inserted into a disk drive DV connected with the computer system MC. A program for conducting a data transmission controlling and processing operation shown in the first, second or third embodiment is recorded on the recording medium D. A computer program is loaded into the program storing unit which the server has through the disk drive DV from the recording medium D. The subsequent processing operation is quite the same as the above described embodiment.

As described above, in the invention, only the screen data displayed when the windows superpose each other with the screen of the first information processing apparatus is transmitted to the first information processing apparatus, the data amount to be transmitted can be reduced and the displaying operation of the screen data can be conducted quickly. When the window displaying operation of the screen of the first information processing apparatus has been changed, the screen data to be transmitted accordingly can be changed, so as to effectively use the transmission zone.

Since the second information processing apparatus where no change is effected during the predetermined period is notified to the first information processing apparatus by the management of the change of the screen data, the user of the first information processing apparatus can know promptly that the user of which second information processing apparatus suspends the operation. Further, the window of the second information processing apparatus where the screen image has been changed is caused to move to the uppermost layer so that the first information processing apparatus can react quickly to the screen image change of the second information processing apparatus.

Through the measuring operation of the respective setting times of a plurality of second information processing apparatus on the first information processing apparatus, since the notification of the change of the screen data is demanded during the respective periods, the controlling operation of the window displaying about a plurality of the second information processing apparatus can be conducted easily.

When the user of the second information processing apparatus has shown the action of the question, the completion or the like, the user of the first information processing apparatus can know promptly that the user of which second information processing apparatus asks a question or completes the operation. Also, since the screen data is transmitted to the first information processing apparatus from the second information processing apparatus only when the screen image of the second information processing apparatus showing the action of the question or the like has been changed, the transmitting zone can be effectively used with the reduced transmission data amount, thus resulting in excellent effects.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A data transmission controlling method, comprising the steps of:
   transmitting screen data to a first information processing apparatus from a plurality of second information processing apparatuses, with the first information processing apparatus and the second information processing apparatuses being connected to each other through a network, so as to display the screen data on the respective display areas assigned to a screen of the first information processing apparatus;

judging whether or not the display areas are superposed on each other;

detecting a hidden area superposed in the display area about the second information processing apparatus where at least one unit of the screen data is not displayed in the display area, among the second information processing apparatuses when the display areas are superposed; and transmitting the screen data except screen data corresponding to the hidden area in the second information processing apparatus, to the first information processing apparatus.

2. The data transmission controlling method according to claim 1, further comprising the steps of:

storing the hidden area detected after detecting of the hidden area;

judging whether or not the hidden area was changed after transmitting the screen data to the first information processing apparatus;

transmitting the screen data, except screen data corresponding to the hidden area changed in the second information processing apparatus, to the first information processing apparatus when the hidden area changes; and storing the hidden area changed.

3. The data transmission controlling method according to claim 1, further comprising the steps of:

judging whether or not the screen data of the second information processing apparatus having the hidden area was renewed;

measuring a predetermined period; and notifying the second information processing apparatus whose screen data is not renewed in the predetermined period, by the first information processing apparatus.

4. The data transmission controlling method according to claim 1, further comprising the steps of:

judging whether or not the screen data of the second information processing apparatus having the hidden area has been renewed; and causing the display area, for displaying the screen data of the second information processing apparatus which [was] has been renewed, to move to the uppermost layer on the first information processing apparatus.

5. The data transmission controlling method according to claim 1, further comprising the steps of:

detecting speaking of a user of the second information processing apparatus; and notifying the second information processing apparatus corresponding to the user whose speaking was detected by the first information processing apparatus.

6. A data transmission controlling system, wherein a first information processing apparatus and a plurality of second information processing apparatuses are mutually connected through a network, the screen data transmitted from the second information processing apparatus are displayed in respective display areas assigned to a screen of the first information processing apparatus, comprising:

means for judging whether or not the display areas are superposed on each other;

means for detecting a hidden area superposed in the display area about the second information processing apparatus where at least one unit of screen data is not displayed in the display area, among the second information processing apparatuses when the display areas are superposed;

means for extracting the remaining screen data except screen data corresponding to the hidden area, from the screen data of the second information processing apparatus; and means for transmitting the extracted screen data to the first information processing apparatus.

7. The data transmission controlling system according to claim 6, further comprising:

means for storing the hidden area detected; and means for judging whether or not the hidden area was changed after transmitting the screen data to the first information processing apparatus;

wherein when the hidden area was changed, the means for extracting the screen data extracts the remaining screen data except screen data corresponding to the changed hidden area, from the screen data of the second information processing apparatus, and the means for storing the hidden area stores the hidden area changed.

8. The data transmission controlling system according to claim 6, further comprising:

means for judging whether or not the screen data of the second information processing apparatuses having the hidden area was renewed;

a timer for measuring a predetermined period; and means for notifying the second information processing apparatus whose screen data is not renewed in the predetermined period, by the first information processing apparatus.

9. The data transmission controlling system according to claim 6, further comprising:

means for judging whether or not the screen data of the second information processing apparatuses having the hidden area has been renewed; and means for causing the display area, for displaying the screen data of the second information processing apparatus which has been renewed, to move to the uppermost layer on the first information processing apparatus.

10. The data transmission controlling system according to claim 6, further comprising:

means for detecting speaking of a user of the second information processing apparatus; and means for notifying the second processing apparatus corresponding to the user whose speaking has been detected by the first information processing apparatus.

11. A first information processing apparatus, wherein the first information processing apparatus and a plurality of second information processing apparatuses are mutually connected through a network, and the screen data transmitted from the second information processing apparatus are displayed in respective display areas assigned to a screen of the first information processing apparatus, comprising:

means for judging whether or not the display areas are superposed on each other;

means for detecting a hidden area superposed in the display area about the second information processing apparatus where at least one unit of screen data is not displayed in the display area, among the second information processing apparatuses when the display areas are superposed; and means for notifying the second information processing apparatus of the hidden area detected.

12. A second information processing apparatus, wherein a first information processing apparatus and the second information processing apparatus are mutually connected through a network, and the screen data transmitted from the second information processing apparatus are displayed in a display area assigned to a screen of the first information processing apparatus, comprising:

means for storing the hidden area, superposed in the display area, notified from the first information processing apparatus;

means for extracting the remaining screen data except screen data corresponding to the hidden area, from the screen data; and transmitting means for transmitting the extracted screen data to the first information processing apparatus.

13. A computer memory product readable by a computer containing a program for controlling the data transmission such that the screen data transmitted from a plurality of second information processing apparatuses display on the respective display areas assigned onto a screen of a first information processing apparatus, with the first information processing apparatus and the second information processing apparatus being mutually connected through the network, the program comprising the steps of:

judging whether or not the display areas are superposed on each other;

detecting a hidden area superposed in the display area about the second information processing apparatus where at least one unit of screen data is not displayed in the display area, among the second information processing apparatuses when the display areas are superposed; and transmitting the screen data except screen data corresponding to the hidden area in the second information processing apparatus, to the first information processing apparatus.

14. The computer memory product according to claim 13, wherein the program further comprises the steps of:

storing the hidden area detected after detecting of the hidden area;

judging whether or not the hidden area has been changed after transmitting the screen data to the first information processing apparatus;

transmitting the screen data except screen data corresponding to the hidden area changed in the second information processing apparatus to the first information processing apparatus when the hidden area has been changed; and storing the hidden area changed.

15. The computer memory product according to claim 13, wherein the program further comprises the steps of:

judging whether or not the screen data of the second information processing apparatus having the hidden area has been renewed;

measuring a predetermined period;

notifying the second information processing apparatus whose screen data is not renewed within the predetermined period, by the first information processing apparatus.

16. The computer memory product according to claim 13, wherein the program further comprises the steps of:

judging whether or not the screen data of the second information processing apparatus having the hidden area has been renewed; and causing the display area, for displaying the screen data of the second information processing apparatus which has been renewed, to move to the uppermost layer on the first information processing apparatus.

17. The computer memory product according to claim 13, wherein the program further comprises the steps of:

detecting speaking of a user of the second information processing apparatus; and notifying the second information processing apparatus corresponding to the user whose speaking was detected by the first information processing apparatus.

18. A computer memory product comprising, a computer usable storage medium having computer readable program code means for controlling data transmission such that screen data transmitted from a plurality of second information processing apparatuses display on respective display areas assigned to a screen of a first information processing apparatus, with the first information processing apparatus and the second information processing apparatus being mutually connected through the network, the computer readable program code means comprising:

first computer readable program code means for causing the computer to judge whether or not the display areas are superposed on each other;

second computer readable program code means for causing the computer to detect the hidden area superposed in the display area, about the second information processing apparatus where at least one unit of screen data is not displayed in the display area, among the second information processing apparatuses when the display areas are superposed; and third computer readable program code means for causing the computer to transmit the screen data, except screen data corresponding to the hidden area in the second information processing apparatuses, to the first information processing apparatus.

19. The computer memory product according to claim 18, wherein the program code means further comprises:

computer readable program code means for causing the computer to store the hidden area detected after detecting of the hidden area;

computer readable program code means for causing the computer to judge whether or not the hidden area was changed after transmitting the screen data to the first information processing apparatus;

computer readable program code means for causing the computer to transmit the screen data except screen data corresponding to the hidden area changed in the second information processing apparatus to the first information processing apparatus when the hidden area was changed; and computer readable program code means for causing the computer to store the hidden area changed.

20. The computer memory product according to claim 18, wherein the program code means further comprises:

computer readable program code means for causing the computer to judge whether or not the screen data of the second information processing apparatus having the hidden area has been renewed;

computer readable program code means for causing the computer to measure a predetermined period; and computer readable program code means for causing the computer to notify the second information processing apparatus whose screen data is not renewed within the predetermined period, by the first information processing apparatus.

21. The computer memory product according to claim 18, wherein the program code means further comprises:

computer readable program code means for causing the computer to judge whether or not the screen data of the second information processing apparatus having the hidden area has been renewed; and computer readable program code means for causing the computer to move the display area for displaying the screen data of the second information processing apparatus which was renewed, on the first information processing apparatus to the uppermost layer.

22. The computer memory product according to claim 18, wherein the program code means further comprises:

computer readable program code means for causing the computer to detect speaking of a user of the second information processing apparatus; and computer readable program code means for causing the computer to notify the second information processing apparatus corresponding to the user whose speaking was detected by the first information processing apparatus.

23. A data transmission controlling method, comprising:

displaying a plurality of sets of screen data from corresponding second information processing apparatuses on respective display areas of a screen of a first information processing apparatus;

determining that at least one of the display areas is superposed on another one of the display areas, so that at least a portion of one of the display areas is hidden; and transmitting the set of screen data, except for the screen data corresponding to the hidden area, from the corresponding second information processing apparatus, to the first information processing apparatus.

\* \* \* \* \*

UNITED STATES PATENT AND TRADEMARK OFFICE
CERTIFICATE OF CORRECTION

PATENT NO.: 6,003,067
DATED : December 14, 1999
INVENTOR(S): Toshimitsu SUZUKI, et al.

It is certified that error appears in the above-identified patent and that said Letters Patent is hereby corrected as shown below:

In the Claims:

Column 15, Line 43, delete "[was]".

Signed and Sealed this

Eleventh Day of July, 2000

*Attest:*

Q. TODD DICKINSON

*Attesting Officer*   *Director of Patents and Trademarks*